US009418238B2

(12) United States Patent
Ito et al.

(10) Patent No.: US 9,418,238 B2
(45) Date of Patent: Aug. 16, 2016

(54) SEARCH SYSTEM, SEARCH METHOD OF SEARCH SYSTEM, AND INFORMATION PROCESSING DEVICE

(75) Inventors: Takashi Ito, Tokyo (JP); Mitsuhiro Hattori, Tokyo (JP); Nori Matsuda, Tokyo (JP); Kazuo Ota, Tokyo (JP); Yusuke Sakai, Tokyo (JP)

(73) Assignees: Mitsubishi Electric Corporation, Tokyo (JP); The University of Electro-Communications, Tokyo (JP)

( * ) Notice: Subject to any disclaimer, the term of this patent is extended or adjusted under 35 U.S.C. 154(b) by 351 days.

(21) Appl. No.: 14/001,028

(22) PCT Filed: Feb. 20, 2012

(86) PCT No.: PCT/JP2012/053948
§ 371 (c)(1),
(2), (4) Date: Aug. 22, 2013

(87) PCT Pub. No.: WO2012/115031
PCT Pub. Date: Aug. 30, 2012

(65) Prior Publication Data
US 2013/0332729 A1 Dec. 12, 2013

(30) Foreign Application Priority Data
Feb. 22, 2011 (JP) ................................. 2011-035677

(51) Int. Cl.
*G06F 21/62* (2013.01)
*H04L 9/00* (2006.01)
(Continued)

(52) U.S. Cl.
CPC ............ *G06F 21/6218* (2013.01); *G06F 21/60* (2013.01); *G06F 21/6227* (2013.01); *H04L 9/002* (2013.01); *H04L 9/0894* (2013.01)

(58) Field of Classification Search
CPC . G06F 21/6218; G06F 21/6227; G06F 21/62; H04L 9/002; H04L 9/0894
See application file for complete search history.

(56) References Cited

U.S. PATENT DOCUMENTS 5,963,642 A 10/1999 Goldstein
6,041,323 A * 3/2000 Kubota ............. G06F 17/30678
(Continued)

FOREIGN PATENT DOCUMENTS

JP 2001 507837 6/2001
JP 2002 55608 2/2002
(Continued)

OTHER PUBLICATIONS

Artzi, Shay, et al. "Encrypted keyword search in a distributed storage system." MIT—Computer Science and Artificial Intelligence Laboratory Technical Report (Feb. 23, 2006).*
(Continued)

*Primary Examiner* — Mahfuzur Rahman
*Assistant Examiner* — Carlos Amorin
(74) *Attorney, Agent, or Firm* — Oblon, McClelland, Maier & Neustadt, L.L.P

(57) ABSTRACT

A searchable encryption resistant to frequency analysis. A conversion rule management device generates a conversion rule table associating a search keyword with a conversion keyword group. Based on the conversion rule table, a data registration device generates registration data associating encrypted data with an encrypted keyword, and registers the registration data in a server device. An information processing device obtains from the conversion rule table a conversion keyword group associated with a specified search keyword, generates an encrypted keyword group, and requests a data search by specifying the encrypted keyword group. Using as a search key an encrypted keyword included in the encrypted keyword group, the server device searches for encrypted data associated with the search key, and returns searched encrypted data. The information processing device decrypts the searched encrypted data, and outputs as a search result search data obtained by decryption.

14 Claims, 43 Drawing Sheets

(51) Int. Cl.
*H04L 9/08* (2006.01)
*G06F 21/60* (2013.01)

(56) References Cited

U.S. PATENT DOCUMENTS

| | | | |
|---|---|---|---|
| 6,212,517 B1 * | 4/2001 | Sato | G06F 17/30616 707/749 |
| 6,424,963 B1 * | 7/2002 | Ito | G06F 17/30687 |
| 7,054,860 B2 * | 5/2006 | Inaba | G06F 17/30648 |
| 2002/0019934 A1 | 2/2002 | Ishizaki | |
| 2005/0259817 A1 | 11/2005 | Ramzan et al. | |
| 2009/0300351 A1 * | 12/2009 | Lei | G06F 17/30864 713/165 |
| 2011/0004607 A1 * | 1/2011 | Lokam | G06F 17/30675 707/759 |
| 2013/0262863 A1 * | 10/2013 | Yoshino | H04L 9/008 713/165 |
| 2015/0039885 A1 * | 2/2015 | Cash | G06F 21/6227 713/165 |

FOREIGN PATENT DOCUMENTS

| | | |
|---|---|---|
| JP | 2005 72917 | 3/2005 |
| JP | 2005 134990 | 5/2005 |
| JP | 2008 500598 | 1/2008 |
| JP | 2008 61035 | 3/2008 |
| JP | 2009 271584 | 11/2009 |
| JP | 2010 231717 | 10/2010 |
| JP | 2011 18976 | 1/2011 |
| JP | 2011018976 A * | 1/2011 |

OTHER PUBLICATIONS

Ito, T., et al., "Efficient Searchable Encryption Schemes Against Frequency Analysis", IEICE Technical Report, vol. 110, No. 443, Total 8 Pages, (Feb. 24, 2011) (with English abstract).
Song, D. X., et al., "Practical Techniques for Searches on Encrypted Data*", IEEE, Total 12 Pages, (2000).
Bellare, M., et al., "Deterministic and Efficiently Searchable Encryption", LNCS, vol. 4622, Total 43 Pages, (2007).
International Search Report Issued Mar. 13, 2012 in PCT/JP12/053948 Filed Feb. 20, 2012.

* cited by examiner

Fig. 7
: SEARCH KEYWORD TABLE
| SEARCH KEYWORD | APPEARANCE FREQUENCY |
|---|---|
| COMPANY A | 25% |
| COMPANY B | 15% |
| COMPANY C | 5% |
| COMPANY D | 5% |
| .. | .. |
| COMPANY N | 5% |
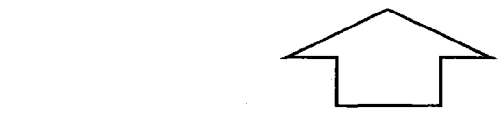
| CONVERSION KEYWORD NUMBER (FREQUENCY DIVISION NUMBER) | CONVERSION PROBABILITY | APPEARANCE FREQUENCY |
|---|---|---|
| 5 | 1/5 | 5% (=25%÷5) |
| 3 | 1/3 | 5% (=15%÷3) |
| 1 | 1/1 | 5% (= 5%÷1) |
| 1 | 1/1 | 5% (= 5%÷1) |
| .. | .. | 5% (= 5%÷1) |
| 1 | 1/1 | 5% (= 5%÷1) |

Fig. 9

291 : CONVERSION RULE TABLE

| SEARCH KEYWORD | CONVERSION PROBABILITY | CONVERSION KEYWORD | APPEARANCE FREQUENCY |
|---|---|---|---|
| COMPANY A | 1/5 | COMPANY A-1 | 5% |
| | 1/5 | COMPANY A-2 | 5% |
| | 1/5 | COMPANY A-3 | 5% |
| | 1/5 | COMPANY A-4 | 5% |
| | 1/5 | COMPANY A-5 | 5% |
| COMPANY B | 1/3 | COMPANY B-1 | 5% |
| | 1/3 | COMPANY B-2 | 5% |
| | 1/3 | COMPANY B-3 | 5% |
| COMPANY C | 1/1 | COMPANY C-1 | 5% |
| COMPANY D | 1/1 | COMPANY D-1 | 5% |
| .. | .. | .. | .. |
| COMPANY N | 1/1 | COMPANY N-1 | 5% |

391: REGISTRATION DATA TABLE

| ENCRYPTED KEYWORD | ENCRYPTED DATA |
|---|---|
| E (COMPANY A-2) | E (DATA a) |
| E (COMPANY A-5) | E (DATA b) |
| E (COMPANY B-1) | E (DATA c) |
| E (COMPANY A-4) | E (DATA d) |
| E (COMPANY B-2) | E (DATA e) |
| .. | .. |

Fig. 12

| ENCRYPTED KEYWORD | REGISTRATION FREQUENCY |
|---|---|
| E (COMPANY A-1) | 5% |
| E (COMPANY A-2) | 5% |
| E (COMPANY A-3) | 5% |
| E (COMPANY A-4) | 5% |
| E (COMPANY A-5) | 5% |
| E (COMPANY B-1) | 5% |
| E (COMPANY B-2) | 5% |
| E (COMPANY B-3) | 5% |
| E (COMPANY C-1) | 5% |
| E (COMPANY D-1) | 5% |
| ‥ | ‥ |
| E (COMPANY N-1) | 5% |

491 : SEARCH KEYWORD TABLE

| SEARCH KEYWORD | APPEARANCE FREQUENCY (INTEGER RATIO) |
|---|---|
| SATO | 40 |
| SUZUKI | 35 |
| TAKAHASHI | 28 |
| TANAKA | 27 |
| WATANABE | 23 |
| ITO | 22 |
| YAMAMOTO | 22 |
| NAKAMURA | 21 |

492 : DIVIDED FREQUENCY TABLE

| SEARCH KEYWORD | APPEARANCE FREQUENCY (INTEGER RATIO) | DIVIDED FREQUENCY |
|---|---|---|
| SATO | 40 | |
| SUZUKI | 35 | |
| TAKAHASHI | 28 | |
| TANAKA | 27 | |
| WATANABE | 23 | |
| ITO | 22 | |
| YAMAMOTO | 22 | |
| NAKAMURA | 21 | |

Fig. 18

| SEARCH KEYWORD | APPEARANCE FREQUENCY | DIVIDED FREQUENCY | | | | |
|---|---|---|---|---|---|---|
| SATO | 40 | | | | | |
| SUZUKI | 35 | | | | | |
| TAKAHASHI | 28 | | | | | |
| TANAKA | 27 | | | | | |
| WATANABE | 23 | | | | | |
| ITO | 22 | | | | | |
| YAMAMOTO | 22 | | | | | |
| NAKAMURA | 21 | | | | | |

DIVIDE BASED ON THIRD GREATEST APPEARANCE FREQUENCY "28"

| SEARCH KEYWORD | APPEARANCE FREQUENCY | DIVIDED FREQUENCY | | | | |
|---|---|---|---|---|---|---|
| SATO | 12 | 28 | | | | |
| SUZUKI | 7 | 28 | | | | |
| TAKAHASHI | 0 | 28 | | | | |
| TANAKA | 27 | | | | | |
| WATANABE | 23 | | | | | |
| ITO | 22 | | | | | |
| YAMAMOTO | 22 | | | | | |
| NAKAMURA | 21 | | | | | |

| SEARCH KEYWORD | APPEARANCE FREQUENCY | | | DIVIDED FREQUENCY | | | |
|---|---|---|---|---|---|---|---|
| SATO | 12 | 28 | | | | | |
| SUZUKI | 7 | 28 | | | | | |
| TAKAHASHI | 0 | 28 | | | | | |
| TANAKA | 27 | | | | | | |
| WATANABE | 23 | | | | | | |
| ITO | 22 | | | | | | |
| YAMAMOTO | 22 | | | | | | |
| NAKAMURA | 21 | | | | | | |

DIVIDE BASED ON THIRD GREATEST APPEARANCE FREQUENCY "22"

(3)

| SEARCH KEYWORD | APPEARANCE FREQUENCY | | | DIVIDED FREQUENCY | | | |
|---|---|---|---|---|---|---|---|
| SATO | 12 | 28 | | | | | |
| SUZUKI | 7 | 28 | | | | | |
| TAKAHASHI | 0 | 28 | | | | | |
| TANAKA | 5 | | | 22 | | | |
| WATANABE | 1 | | | 22 | | | |
| ITO | 0 | | | 22 | | | |
| YAMAMOTO | 0 | | | 22 | | | |
| NAKAMURA | 21 | | | | | | |

| SEARCH KEYWORD | APPEARANCE FREQUENCY | | | DIVIDED FREQUENCY | | |
|---|---|---|---|---|---|---|
| SATO | 12 | 28 | | | | |
| SUZUKI | 7 | 28 | | | | |
| TAKAHASHI | 0 | 28 | | | | |
| TANAKA | 5 | | 22 | | | |
| WATANABE | 1 | | 22 | | | |
| ITO | 0 | | 22 | | | |
| YAMAMOTO | 0 | | 22 | | | |
| NAKAMURA | 21 | | | | | |

DIVIDE BASED ON THIRD GREATEST APPEARANCE FREQUENCY "7"

(4)

| SEARCH KEYWORD | APPEARANCE FREQUENCY | | | DIVIDED FREQUENCY | | |
|---|---|---|---|---|---|---|
| SATO | 5 | 28 | | 7 | | |
| SUZUKI | 0 | 28 | | 7 | | |
| TAKAHASHI | 0 | 28 | | | | |
| TANAKA | 5 | | 22 | | | |
| WATANABE | 1 | | 22 | | | |
| ITO | 0 | | 22 | | | |
| YAMAMOTO | 0 | | 22 | | | |
| NAKAMURA | 0 | | | 7, 7, 7 | | |

| SEARCH KEYWORD | APPEARANCE FREQUENCY | DIVIDED FREQUENCY | | |
|---|---|---|---|---|
| SATO | 5 | 28 | | |
| SUZUKI | 0 | 28 | | |
| TAKAHASHI | 0 | 28 | | |
| TANAKA | 5 | | 22 | |
| WATANABE | 1 | | 22 | |
| ITO | 0 | | 22 | |
| YAMAMOTO | 0 | | 22 | |
| NAKAMURA | 0 | | | 7, 7, 7 |

DIVIDE BASED ON THIRD GREATEST APPEARANCE FREQUENCY "1"

(5)

| SEARCH KEYWORD | APPEARANCE FREQUENCY | DIVIDED FREQUENCY | | | |
|---|---|---|---|---|---|
| SATO | 0 | 28 | | 7 | 1, 1, 1, 1, 1 |
| SUZUKI | 0 | 28 | | 7 | |
| TAKAHASHI | 0 | 28 | | | |
| TANAKA | 0 | | 22 | | 1, 1, 1, 1, 1 |
| WATANABE | 0 | | 22 | | 1 |
| ITO | 0 | | 22 | | |
| YAMAMOTO | 0 | | 22 | | |
| NAKAMURA | 0 | | | 7, 7, 7 | |

Fig. 22

291 : CONVERSION RULE TABLE

| SEARCH KEYWORD | CONVERSION PROBABILITY | CONVERSION KEYWORD | APPEARANCE FREQUENCY (INTEGER RATIO) |
|---|---|---|---|
| SATO | 28/40 | SATO-1 | 28 |
| | 7/40 | SATO-2 | 7 |
| | 1/40 | SATO-3 | 1 |
| | 1/40 | SATO-4 | 1 |
| | 1/40 | SATO-5 | 1 |
| | 1/40 | SATO-6 | 1 |
| | 1/40 | SATO-7 | 1 |
| SUZUKI | 28/35 | SUZUKI-1 | 28 |
| | 7/35 | SUZUKI-2 | 7 |
| TAKAHASHI | 28/28 | TAKAHASHI-1 | 28 |
| TANAKA | 22/27 | TANAKA-1 | 22 |
| | 1/27 | TANAKA-2 | 1 |
| | 1/27 | TANAKA-3 | 1 |
| | 1/27 | TANAKA-4 | 1 |
| | 1/27 | TANAKA-5 | 1 |
| | 1/27 | TANAKA-6 | 1 |
| WATANABE | 22/23 | WATANABE-1 | 22 |
| | 1/23 | WATANABE-2 | 1 |
| ITO | 22/22 | ITO-1 | 22 |
| YAMAMOTO | 22/22 | YAMAMOTO-1 | 22 |
| NAKAMURA | 7/21 | NAKAMURA-1 | 7 |
| | 7/21 | NAKAMURA-2 | 7 |
| | 7/21 | NAKAMURA-3 | 7 |

Fig. 23

| ENCRYPTED KEYWORD | REGISTRATION FREQUENCY (INTEGER RATIO) |
|---|---|
| E (SATO−1) | 28 |
| E (SATO−2) | 7 |
| E (SATO−3) | 1 |
| E (SATO−4) | 1 |
| E (SATO−5) | 1 |
| E (SATO−6) | 1 |
| E (SATO−7) | 1 |
| E (SUZUKI−1) | 28 |
| E (SUZUKI−2) | 7 |
| E (TAKAHASHI−1) | 28 |
| E (TANAKA−1) | 22 |
| E (TANAKA−2) | 1 |
| E (TANAKA−3) | 1 |
| E (TANAKA−4) | 1 |
| E (TANAKA−5) | 1 |
| E (TANAKA−6) | 1 |
| E (WATANABE−1) | 22 |
| E (WATANABE−2) | 1 |
| E (ITO−1) | 22 |
| E (YAMAMOTO−1) | 22 |
| E (NAKAMURA−1) | 7 |
| E (NAKAMURA−2) | 7 |
| E (NAKAMURA−3) | 7 |

Fig. 24

491 : SEARCH KEYWORD TABLE

| SEARCH KEYWORD | APPEARANCE FREQUENCY |
|---|---|
| SATO | 40 |
| SUZUKI | 35 |
| TAKAHASHI | 28 |
| TANAKA | 27 |
| WATANABE | 22 |
| ITO | 22 |
| YAMAMOTO | 22 |
| NAKAMURA | 21 |

492 : DIVIDED FREQUENCY TABLE

| SEARCH KEYWORD | APPEARANCE FREQUENCY | DIVIDED FREQUENCY | | |
|---|---|---|---|---|
| SATO | 5 | 28 | | 7 |
| SUZUKI | 0 | 28 | | 7 |
| TAKAHASHI | 0 | 28 | | |
| TANAKA | 5 | | 22 | |
| WATANABE | 0 | | 22 | |
| ITO | 0 | | 22 | |
| YAMAMOTO | 0 | | 22 | |
| NAKAMURA | 0 | | | 7, 7, 7 |

| SEARCH KEYWORD | APPEARANCE FREQUENCY | DIVIDED FREQUENCY | | | |
|---|---|---|---|---|---|
| SATO | 5 | 28 | | | |
| SUZUKI | 0 | 28 | | 7 | |
| TAKAHASHI | 0 | 28 | | 7 | |
| TANAKA | 5 | | 22 | | |
| WATANABE | 0 | | 22 | | |
| ITO | 0 | | 22 | | |
| YAMAMOTO | 0 | | 22 | | |
| NAKAMURA | 0 | | | | 7, 7, 7 |

RETURN DIVIDED FREQUENCY "7" (MORE THAN 3 OF WHICH REMAINING) TO APPEARANCE FREQUENCY (2)

| SEARCH KEYWORD | APPEARANCE FREQUENCY | DIVIDED FREQUENCY | | | |
|---|---|---|---|---|---|
| SATO | 5 | 28 | | | |
| SUZUKI | 0 | 28 | | 7 | |
| TAKAHASHI | 0 | 28 | | 7 | |
| TANAKA | 5 | | 22 | | |
| WATANABE | 0 | | 22 | | |
| ITO | 0 | | 22 | | |
| YAMAMOTO | 0 | | 22 | | |
| NAKAMURA | 7 | | | | 7, 7 |

| SEARCH KEYWORD | APPEARANCE FREQUENCY | DIVIDED FREQUENCY | | | |
|---|---|---|---|---|---|
| SATO | 5 | 28 | | 7 | |
| SUZUKI | 0 | 28 | | 7 | |
| TAKAHASHI | 0 | 28 | | | |
| TANAKA | 5 | | 22 | | |
| WATANABE | 0 | | 22 | | |
| ITO | 0 | | 22 | | |
| YAMAMOTO | 0 | | 22 | | |
| NAKAMURA | 7 | | | 7, 7 | |

DIVIDE REMAINING APPEARANCE FREQUENCIES "5", "5", AND "7"

(3)

| SEARCH KEYWORD | APPEARANCE FREQUENCY | DIVIDED FREQUENCY | | | |
|---|---|---|---|---|---|
| SATO | 0 | 28 | | 7 | 3 | 2 |
| SUZUKI | 0 | 28 | | 7 | | |
| TAKAHASHI | 0 | 28 | | | | |
| TANAKA | 0 | | 22 | | 3 | 2 |
| WATANABE | 0 | | 22 | | | |
| ITO | 0 | | 22 | | | |
| YAMAMOTO | 0 | | 22 | | | |
| NAKAMURA | 0 | | | 7, 7 | 3 | 2, 2 |

| SEARCH KEYWORD | APPEARANCE FREQUENCY | DIVIDED FREQUENCY | | |
|---|---|---|---|---|
| SATO | 5 | 28 | | 7 |
| SUZUKI | 0 | 28 | | 7 |
| TAKAHASHI | 0 | 28 | | |
| TANAKA | 5 | | 22 | |
| WATANABE | 1 | | 22 | |
| ITO | 0 | | 22 | |
| YAMAMOTO | 0 | | 22 | |
| NAKAMURA | 7 | | | 7, 7 |

(A)

| SEARCH KEYWORD | APPEARANCE FREQUENCY | DIVIDED FREQUENCY | | | |
|---|---|---|---|---|---|
| SATO | 0 | 28 | | 7 | 4 |
| SUZUKI | 0 | 28 | | 7 | |
| TAKAHASHI | 0 | 28 | | | |
| TANAKA | 0 | | 22 | | 4 |
| WATANABE | 0 | | 22 | | |
| ITO | 0 | | 22 | | |
| YAMAMOTO | 0 | | 22 | | |
| NAKAMURA | 0 | | | 7, 7 | 4 | 1, 1, 1 |

(B)

| SEARCH KEYWORD | APPEARANCE FREQUENCY | DIVIDED FREQUENCY | | | |
|---|---|---|---|---|---|
| SATO | 0 | 28 | | 7 | 3 | 1, 1 |
| SUZUKI | 0 | 28 | | 7 | | |
| TAKAHASHI | 0 | 28 | | | | |
| TANAKA | 0 | | 22 | | 3 | 1, 1 |
| WATANABE | 0 | | 22 | | | 1 |
| ITO | 0 | | 22 | | | |
| YAMAMOTO | 0 | | 22 | | | |
| NAKAMURA | 0 | | | 7, 7 | 3, 3 | 1 |

Fig. 30

<3-ANONYMITY>

| SEARCH KEYWORD | APPEARANCE FREQUENCY | DIVIDED FREQUENCY | | | |
|---|---|---|---|---|---|
| SATO | 0 | 28 | | | |
| SUZUKI | 0 | 28 | | 7 | |
| TAKAHASHI | 0 | 28 | | 7 | |
| TANAKA | 0 | | 22 | | 4 |
| WATANABE | 0 | | 22 | | 4 |
| ITO | 0 | | 22 | | |
| YAMAMOTO | 0 | | 22 | | |
| NAKAMURA | 0 | | | 7, 7 | 4, 1, 1, 1 |

⇕

<4-ANONYMITY>

| SEARCH KEYWORD | APPEARANCE FREQUENCY | DIVIDED FREQUENCY | | | |
|---|---|---|---|---|---|
| SATO | 0 | 27 | | 4, 4, 4 | 1 |
| SUZUKI | 0 | 27 | | 4, 4 | |
| TAKAHASHI | 0 | 27 | | | 1 |
| TANAKA | 0 | 27 | | | |
| WATANABE | 0 | | 18 | 4 | 1 |
| ITO | 0 | | 18 | 4 | |
| YAMAMOTO | 0 | | 18 | 4 | |
| NAKAMURA | 0 | | 18 | | 1, 1, 1 |

| SEARCH KEYWORD | APPEARANCE FREQUENCY | DIVIDED FREQUENCY | | | | | |
|---|---|---|---|---|---|---|---|
| SATO | 40 | | | | | | |
| SUZUKI | 35 | | | | | | |
| TAKAHASHI | 28 | | | | | | |
| TANAKA | 27 | | | | | | |
| WATANABE | 23 | | | | | | |
| ITO | 22 | | | | | | |
| YAMAMOTO | 22 | | | | | | |
| NAKAMURA | 21 | | | | | | |

⇓ 2-ADIC EXPANSION (2)

| SEARCH KEYWORD | APPEARANCE FREQUENCY | DIVIDED FREQUENCY | | | | | |
|---|---|---|---|---|---|---|---|
| SATO | 40 | 32 | 8 | | | | |
| SUZUKI | 35 | 32 | | | 2 | | 1 |
| TAKAHASHI | 28 | | 16 | 8 | | 4 | |
| TANAKA | 27 | | 16 | 8 | | | 2 | 1 |
| WATANABE | 23 | | 16 | | 4 | 2 | 1 |
| ITO | 22 | | 16 | | 4 | 2 | |
| YAMAMOTO | 22 | | 16 | | 4 | 2 | |
| NAKAMURA | 21 | | 16 | | 4 | | 1 |

| SEARCH KEYWORD | APPEARANCE FREQUENCY | DIVIDED FREQUENCY | | | | |
|---|---|---|---|---|---|---|
| SATO | 40 | 32 | | | | |
| SUZUKI | 35 | 32 | | | | |
| TAKAHASHI | 28 | | 16 | 8 | 4 | 2 |
| TANAKA | 27 | | 16 | 8 | 4 | 2 |
| WATANABE | 23 | | 16 | | 4 | 2 | 1 |
| ITO | 22 | | 16 | 8 | 4 | 2 | 1 |
| YAMAMOTO | 22 | | 16 | | 4 | 2 | 1 |
| NAKAMURA | 21 | | 16 | | 4 | | 1 |

DIVIDE DIVIDED FREQUENCY "32" (LESS THAN 3 OF WHICH REMAINING)

(3)

| SEARCH KEYWORD | APPEARANCE FREQUENCY | DIVIDED FREQUENCY | | | | |
|---|---|---|---|---|---|---|
| SATO | 40 | 16, 16 | 8 | 4 | | |
| SUZUKI | 35 | 16, 16 | | | 2 | 1 |
| TAKAHASHI | 28 | 16 | 8 | 4 | | |
| TANAKA | 27 | 16 | 8 | 4 | | |
| WATANABE | 23 | 16 | | 4 | 2 | 1 |
| ITO | 22 | 16 | | 4 | 2 | 1 |
| YAMAMOTO | 22 | 16 | | 4 | 2 | |
| NAKAMURA | 21 | 16 | | 4 | | 1 |

Fig. 34

291 : CONVERSION RULE TABLE

| SEARCH KEYWORD | CONVERSION PROBABILITY | CONVERSION KEYWORD | APPEARANCE FREQUENCY (INTEGER RATIO) |
|---|---|---|---|
| SATO | 16/40 | SATO-1 | 16 |
| | 16/40 | SATO-2 | 16 |
| | 8/40 | SATO-3 | 8 |
| SUZUKI | 16/35 | SUZUKI-1 | 16 |
| | 16/35 | SUZUKI-2 | 16 |
| | 2/35 | SUZUKI-3 | 2 |
| | 1/35 | SUZUKI-4 | 1 |
| TAKAHASHI | 16/28 | TAKAHASHI-1 | 16 |
| | 8/28 | TAKAHASHI-2 | 8 |
| | 4/28 | TAKAHASHI-3 | 4 |
| TANAKA | 16/27 | TANAKA-1 | 16 |
| | 8/27 | TANAKA-2 | 8 |
| | 2/27 | TANAKA-3 | 2 |
| | 1/27 | TANAKA-4 | 1 |
| WATANABE | 16/23 | WATANABE-1 | 16 |
| | 4/23 | WATANABE-2 | 4 |
| | 2/23 | WATANABE-3 | 2 |
| | 1/23 | WATANABE-4 | 1 |
| ITO | 16/22 | ITO-1 | 16 |
| | 4/22 | ITO-2 | 4 |
| | 2/22 | ITO-3 | 2 |
| YAMAMOTO | 16/22 | YAMAMOTO-1 | 16 |
| | 4/22 | YAMAMOTO-2 | 4 |
| | 2/22 | YAMAMOTO-3 | 2 |
| NAKAMURA | 16/21 | NAKAMURA-1 | 16 |
| | 4/21 | NAKAMURA-2 | 4 |
| | 1/21 | NAKAMURA-3 | 1 |

Fig. 35

| ENCRYPTED KEYWORD | REGISTRATION FREQUENCY (INTEGER RATIO) |
|---|---|
| E (SATO-1) | 16 |
| E (SATO-2) | 16 |
| E (SATO-3) | 8 |
| E (SUZUKI-1) | 16 |
| E (SUZUKI-2) | 16 |
| E (SUZUKI-3) | 2 |
| E (SUZUKI-4) | 1 |
| E (TAKAHASHI-1) | 16 |
| E (TAKAHASHI-2) | 8 |
| E (TAKAHASHI-3) | 4 |
| E (TANAKA-1) | 16 |
| E (TANAKA-2) | 8 |
| E (TANAKA-3) | 2 |
| E (TANAKA-4) | 1 |
| E (WATANABE-1) | 16 |
| E (WATANABE-2) | 4 |
| E (WATANABE-3) | 2 |
| E (WATANABE-4) | 1 |
| E (ITO-1) | 16 |
| E (ITO-2) | 4 |
| E (ITO-3) | 2 |
| E (YAMAMOTO-1) | 16 |
| E (YAMAMOTO-2) | 4 |
| E (YAMAMOTO-3) | 2 |
| E (NAKAMURA-1) | 16 |
| E (NAKAMURA-2) | 4 |
| E (NAKAMURA-3) | 1 |

| SEARCH KEYWORD | APPEARANCE FREQUENCY | DIVIDED FREQUENCY | | | |
|---|---|---|---|---|---|
| SATO | 40 | 16, 16 | 8 | | |
| SUZUKI | 35 | 16, 16 | | | 2 |
| TAKAHASHI | 28 | 16 | 8 | 4 | |
| TANAKA | 27 | 16 | 8 | | 2 |
| WATANABE | 23 | 16 | | 4 | 2 |
| ITO | 22 | 16 | | 4 | 2 |
| YAMAMOTO | 22 | 16 | | 4 | 2 |
| NAKAMURA | 21 | 16 | | 4 | 1 |

INTEGRATE DIVIDED FREQUENCIES "16" AND "2"

(4)

| SEARCH KEYWORD | APPEARANCE FREQUENCY | DIVIDED FREQUENCY | | | |
|---|---|---|---|---|---|
| SATO | 40 | 16, 16 | 8 | | |
| SUZUKI | 35 | 18 | 16 | 8 | 1 |
| TAKAHASHI | 28 | 18 | | 8 | |
| TANAKA | 27 | 18 | 16 | 8 | 1 |
| WATANABE | 23 | 18 | | | 4 |
| ITO | 22 | | | | 4 |
| YAMAMOTO | 22 | | | | 4 |
| NAKAMURA | 21 | | 16 | | 4 1 |

Fig. 37

291 : CONVERSION RULE TABLE

| SEARCH KEYWORD | CONVERSION PROBABILITY | CONVERSION KEYWORD | APPEARANCE FREQUENCY (INTEGER RATIO) |
|---|---|---|---|
| SATO | 16/40 | SATO-1 | 16 |
| | 16/40 | SATO-2 | 16 |
| | 8/40 | SATO-3 | 8 |
| SUZUKI | 18/35 | SUZUKI-1 | 18 |
| | 16/35 | SUZUKI-2 | 16 |
| | 1/35 | SUZUKI-3 | 1 |
| TAKAHASHI | 16/28 | TAKAHASHI-1 | 16 |
| | 8/28 | TAKAHASHI-2 | 8 |
| | 4/28 | TAKAHASHI-3 | 4 |
| TANAKA | 18/27 | TANAKA-1 | 18 |
| | 8/27 | TANAKA-2 | 8 |
| | 1/27 | TANAKA-3 | 1 |
| WATANABE | 18/23 | WATANABE-1 | 18 |
| | 4/23 | WATANABE-2 | 4 |
| | 1/23 | WATANABE-3 | 1 |
| ITO | 18/22 | ITO-1 | 18 |
| | 4/22 | ITO-2 | 4 |
| YAMAMOTO | 18/22 | YAMAMOTO-1 | 18 |
| | 4/22 | YAMAMOTO-2 | 4 |
| NAKAMURA | 16/21 | NAKAMURA-1 | 16 |
| | 4/21 | NAKAMURA-2 | 4 |
| | 1/21 | NAKAMURA-3 | 1 |

Fig. 38

| ENCRYPTED KEYWORD | REGISTRATION FREQUENCY (INTEGER RATIO) |
|---|---|
| E (SATO-1) | 16 |
| E (SATO-2) | 16 |
| E (SATO-3) | 8 |
| E (SUZUKI-1) | 18 |
| E (SUZUKI-2) | 16 |
| E (SUZUKI-3) | 1 |
| E (TAKAHASHI-1) | 16 |
| E (TAKAHASHI-2) | 8 |
| E (TAKAHASHI-3) | 4 |
| E (TANAKA-1) | 18 |
| E (TANAKA-2) | 8 |
| E (TANAKA-3) | 1 |
| E (WATANABE-1) | 18 |
| E (WATANABE-2) | 4 |
| E (WATANABE-3) | 1 |
| E (ITO-1) | 18 |
| E (ITO-2) | 4 |
| E (YAMAMOTO-1) | 18 |
| E (YAMAMOTO-2) | 4 |
| E (NAKAMURA-1) | 16 |
| E (NAKAMURA-2) | 4 |
| E (NAKAMURA-3) | 1 |

Fig. 40

491 : SEARCH KEYWORD TABLE

| SEARCH KEYWORD | APPEARANCE FREQUENCY |
|---|---|
| MARRIED | 75% |
| UNMARRIED | 25% |

Fig. 41

291 : CONVERSION RULE TABLE (1)

| SEARCH KEYWORD | CONVERSION PROBABILITY | CONVERSION KEYWORD |
|---|---|---|
| MARRIED | 1/1 | MARRIED-1 |
| UNMARRIED | 1/1 | UNMARRIED-1 |

291 : CONVERSION RULE TABLE (2)

| SEARCH KEYWORD | APPEARANCE FREQUENCY | CONVERSION KEYWORD |
|---|---|---|
| MARRIED | 1/2 | MARRIED-1 |
| | 1/2 | MARRIED-2 |
| UNMARRIED | 1/2 | UNMARRIED-1 |
| | 1/2 | UNMARRIED-2 |

| SEARCH KEYWORD | ENCRYPTED KEYWORD |
|---|---|
| MARRIED | E (MARRIED−1) |
| UNMARRIED | E (UNMARRIED−1) |

(2)

| SEARCH KEYWORD | ENCRYPTED KEYWORD |
|---|---|
| MARRIED | E (UNMARRIED−1) |
| UNMARRIED | E (MARRIED−1) |

| SEARCH KEYWORD | ENCRYPTED KEYWORD |
|---|---|
| MARRIED | E (MARRIED−1), E (MARRIED−2) |
| UNMARRIED | E (UNMARRIED−1), E (UNMARRIED−2) |

(2)

| SEARCH KEYWORD | ENCRYPTED KEYWORD |
|---|---|
| MARRIED | E (MARRIED−1), E (UNMARRIED−1) |
| UNMARRIED | E (MARRIED−2), E (UNMARRIED−2) |

(3)

| SEARCH KEYWORD | ENCRYPTED KEYWORD |
|---|---|
| MARRIED | E (MARRIED−1), E (UNMARRIED−2) |
| UNMARRIED | E (MARRIED−2), E (UNMARRIED−1) |

(4)

| SEARCH KEYWORD | ENCRYPTED KEYWORD |
|---|---|
| MARRIED | E (MARRIED−2), E (UNMARRIED−1) |
| UNMARRIED | E (MARRIED−1), E (UNMARRIED−2) |

(5)

| SEARCH KEYWORD | ENCRYPTED KEYWORD |
|---|---|
| MARRIED | E (MARRIED−2), E (UNMARRIED−2) |
| UNMARRIED | E (MARRIED−1), E (UNMARRIED−1) |

(6)

| SEARCH KEYWORD | ENCRYPTED KEYWORD |
|---|---|
| MARRIED | E (UNMARRIED−1), E (UNMARRIED−2) |
| UNMARRIED | E (MARRIED−1), E (MARRIED−2) |

SEARCH SYSTEM, SEARCH METHOD OF SEARCH SYSTEM, AND INFORMATION PROCESSING DEVICE

This application is the national stage entry of PCT/JP2012/053948, filed Feb. 20, 2012, the entire contents of which are incorporated herein by reference. PCT/JP2012/053948 claims the benefit of priority to JP 2011-035677, filed Feb. 22, 2011, the entire contents of which are incorporated herein by reference.

TECHNICAL FIELD

The present invention relates, for example, to a search system that performs searchable encryption, a search method of the search system, an information processing device, a search program, a corresponding keyword management device, and a corresponding keyword management program.

BACKGROUND ART

A searchable encryption system enables a search user to search for data stored in a server by specifying a keyword, and at that time the data and the keyword are kept secret to the server.

Searchable encryption systems are expected to be applied to outsourcing of confidential data management and filtering of encrypted mail messages in a mail server.

Thus, as techniques for searchable encryption systems, there have been proposed techniques for achieving various security requirements and techniques for reducing storage, communication overhead, and computational overhead of servers and search users.

In particular, in a searchable encryption technique based on deterministic encryption, the same keyword corresponds to the same encrypted keyword, so that a server is only required to search for matching data based on a specified encrypted keyword. This allows acceleration using existing search techniques.

However, when a keyword is encrypted using deterministic encryption, the frequency information of the keyword is directly reflected in the frequency information of the encrypted keyword. Therefore, by investigating the frequency of an encrypted keyword, a corresponding keyword can be guessed. That is, an attack called "frequency analysis" is possible.

As a countermeasure against this frequency analysis, there is a method in which dummy data is inserted to disturb frequencies.

Patent Literature 1 discloses a method for generating dummy data using character strings not normally used in searching, such as punctuation marks. By this method, resistance against frequency analysis can be provided without increasing the database size.

CITATION LIST

Patent Literature

Patent Literature 1: JP 2005-72917 A

DISCLOSURE OF INVENTION

Technical Problem

In the method for disturbing frequencies by inserting dummy data, if the frequencies of keywords vary greatly to begin with, it is necessary to provide a large amount of dummy data corresponding to differences in the frequencies.

In Patent Literature 1, the database size is prevented from being increased by using character strings not used in searching. However, with some types of database, there may be a small number of or no "character strings not used in searching". In this case, frequencies cannot be disturbed efficiently.

It is an object of the present invention, for example, to realize high-speed searchable encryption resistant to frequency analysis by efficiently disturbing frequencies regardless of how frequencies of keywords are distributed.

Solution to Problem

A search system according to the present invention includes an information processing device and a search device.

The information processing device includes a corresponding keyword storage unit that stores as corresponding keyword data a corresponding keyword group associating a search keyword with one or more corresponding keywords;

a search keyword input unit that inputs a search keyword;

a corresponding keyword group acquisition unit that obtains from the corresponding keyword data stored in the corresponding keyword storage unit a corresponding keyword group associated with the search keyword input by the search keyword input unit;

an encrypted keyword group generation unit that encrypts corresponding keywords included in the corresponding keyword group obtained by the corresponding keyword group acquisition unit, thereby generating an encrypted keyword group;

a search request data transmission unit that transmits to the search device search request data including the encrypted keyword group generated by the encrypted keyword group generation unit;

a search response data receiving unit that receives search response data transmitted from the search device; and a search result output unit that decrypts encrypted data included in the search response data received by the search response data receiving unit, and outputs as a search result search data obtained by decryption.

The Search Device Includes an encrypted data storage unit that stores encrypted data generated by encrypting search data, the encrypted data storage unit storing for each search data the encrypted data generated by encrypting the each search data and an encrypted keyword generated by encrypting a corresponding keyword, the encrypted data and the encrypted keyword being associated with each other;

a search request data receiving unit that receives the search request data transmitted by the information processing device;

an encrypted data search unit that obtains encrypted data associated with a search key from the encrypted data storage unit using as the search key an encrypted keyword included in the encrypted keyword group in the search request data, based on the search request data received by the search request data receiving unit; and a search response data transmission unit that transmits the search response data including the encrypted data obtained by the encrypted data search unit.

Advantageous Effects of Invention

According to the present invention, for example, by associating search data with a plurality of encrypted keywords, it is possible to efficiently disturb frequencies regardless of how frequencies of keywords are distributed and realize high-speed searchable encryption resistant to frequency analysis.

BRIEF DESCRIPTION OF DRAWINGS

FIG. 7 is a diagram showing a search keyword table 491 in the first embodiment;

FIG. 9 is a diagram showing a conversion rule table 291 in the first embodiment;

FIG. 12 is a diagram showing registration frequencies of encrypted keywords in the first embodiment;

FIG. 18 is a schematic diagram of the conversion rule calculation process (S110) in the second embodiment;

FIG. 19 is a schematic diagram of the conversion rule calculation process (S110) in the second embodiment;

FIG. 20 is a schematic diagram of the conversion rule calculation process (S110) in the second embodiment;

FIG. 21 is a schematic diagram of the conversion rule calculation process (S110) in the second embodiment;

FIG. 22 is a diagram showing a conversion rule table 291 in the second embodiment;

FIG. 23 is a diagram showing registration frequencies of encrypted keywords in the second embodiment;

FIG. 24 is a diagram showing another example of the search keyword table 491 and the divided frequency table 492 in the second embodiment;

FIG. 26 is a schematic diagram of the re-division process (S116B) in the second embodiment;

FIG. 27 is a schematic diagram of the re-division process (S116B) in the second embodiment;

FIG. 28 is a diagram showing optimization of divided frequencies in the second embodiment;

FIG. 30 is a diagram showing optimization of divided frequencies in the second embodiment;

FIG. 32 is a schematic diagram of the conversion rule calculation process (S110) in the third embodiment;

FIG. 33 is a schematic diagram of the conversion rule calculation process (S110) in the third embodiment;

FIG. 34 is a diagram showing a conversion rule table 291 in the third embodiment;

FIG. 35 is a diagram showing registration frequencies of encrypted keywords in the third embodiment;

FIG. 36 is a diagram showing a specific example of optimization of a divided frequency table 492 in the third embodiment;

FIG. 37 is a diagram showing another example of the conversion rule table 291 in the third embodiment;

FIG. 38 is a diagram showing another example of registration frequencies of encrypted keywords in the third embodiment;

FIG. 40 is a diagram showing a search keyword table 491 in the fourth embodiment;

FIG. 41 is a diagram showing an example of a conversion rule table 291 in the fourth embodiment;

FIG. 42 is a diagram showing an example of combinations of search keywords and conversion keywords in the fourth embodiment; and FIG. 43 is a diagram showing an example of combinations of search keywords and conversion keywords in the fourth embodiment.

DESCRIPTION OF PREFERRED EMBODIMENTS

First Embodiment

Description will be directed to an embodiment of a searchable encryption system that searches for data using encrypted search keywords and prevents frequency analysis of the encrypted search keywords.

Figure 1:
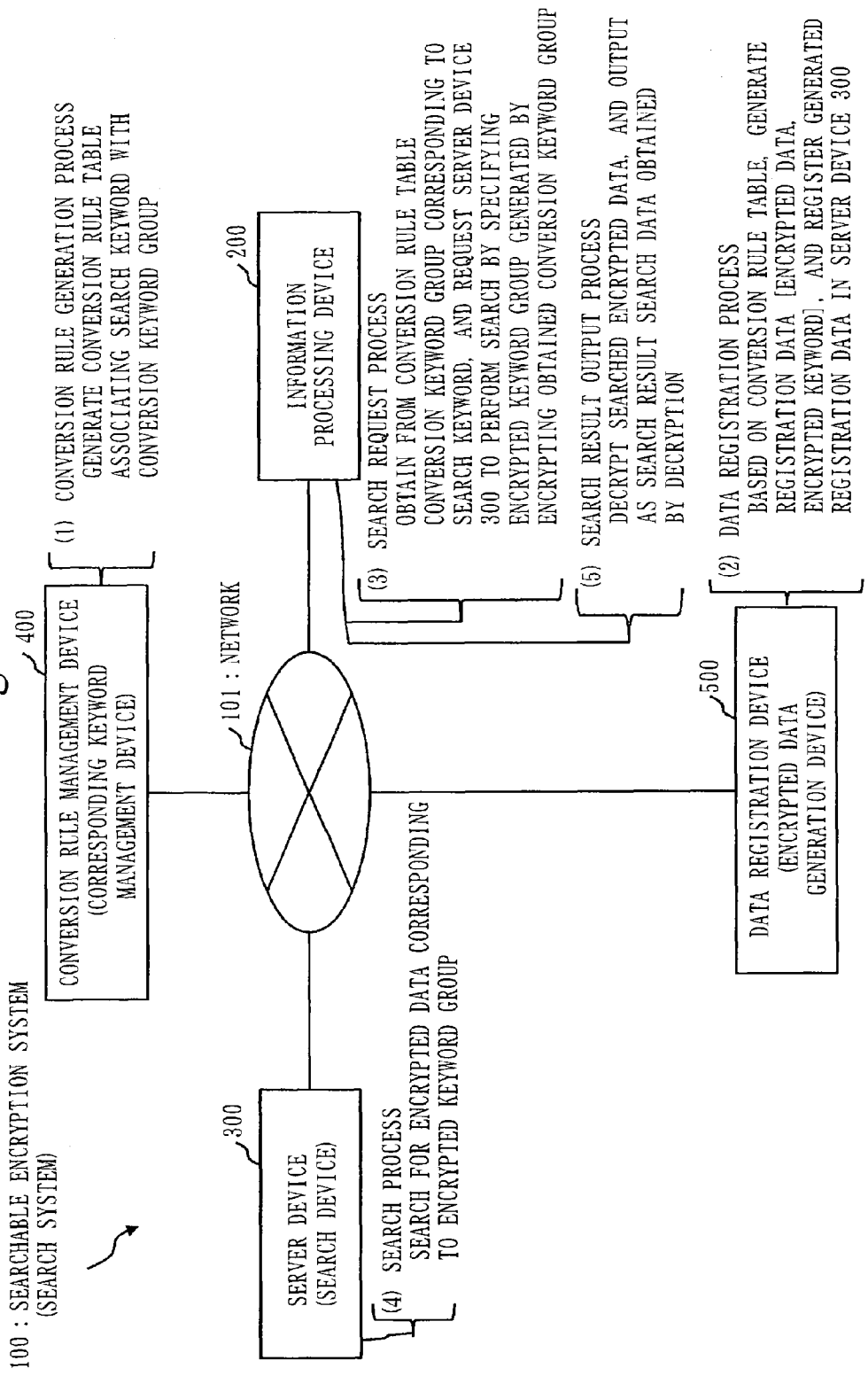
FIG. 1 is a configuration diagram of a searchable encryption system 100 in a first embodiment.

FIG. 1 is a configuration diagram of a searchable encryption system 100 in a first embodiment.

Referring to FIG. 1, the searchable encryption system 100 in the first embodiment will be described in outline.

The searchable encryption system 100 (an example of a search system) includes an information processing device 200, a server device 300 (an example of a search device), a conversion rule management device 400 (an example of a corresponding keyword management device), and a data registration device 500 (an example of an encrypted data generation device). These devices communicate with one another through a network 101.

(1) The conversion rule management device 400 generates a conversion rule table associating each search keyword with a conversion keyword group (conversion rule generation process).

(2) Based on the conversion rule table, the data registration device 500 generates registration data associating encrypted data with an encrypted keyword, the encrypted data being encrypted search data and the encrypted keyword being an encrypted conversion keyword. Then, the data registration device 500 registers the registration data in the server device 300 (data registration process).

(3) The information processing device 200 obtains from the conversion rule table a conversion keyword group corresponding to a search keyword specified by a user, and encrypts the obtained conversion keyword group, thereby generating an encrypted keyword group. Then, the information processing device 200 requests the server device 300 to perform a data search by specifying the encrypted keyword group (search request process).

(4) Using as a search key an encrypted keyword included in the encrypted keyword group specified by the information processing device 200, the server device 300 searches for encrypted data corresponding to the search key. Then, the server device 300 returns the searched encrypted data to the information processing device 200 (search process).

(5) The information processing device 200 decrypts the encrypted data searched by the server device 300, and outputs as a search result search data obtained by decryption (search result output process).

The searchable encryption system 100 will now be described in detail.

Figure 2:
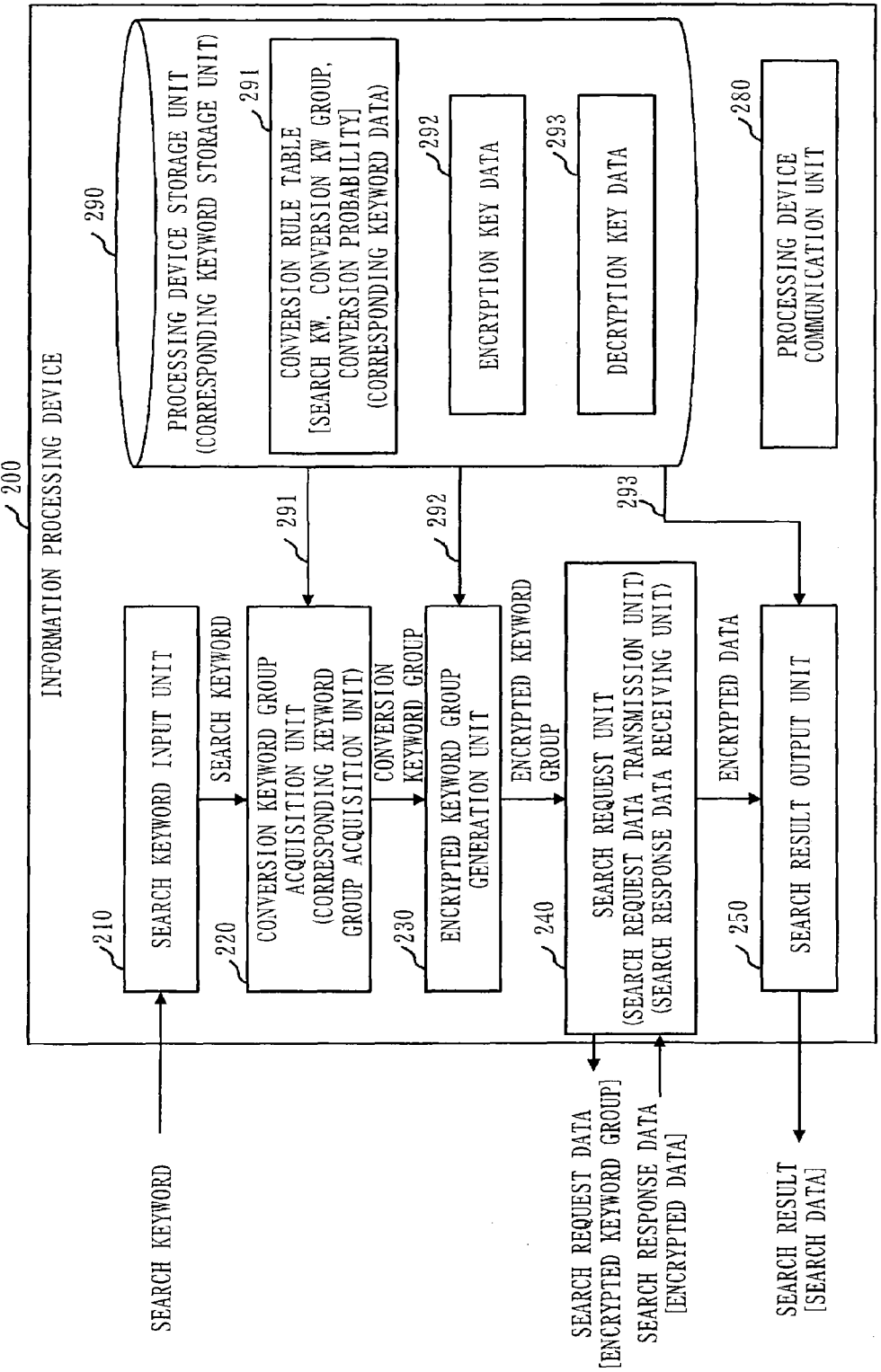
FIG. 2 is a functional configuration diagram of an information processing device 200 in the first embodiment.

FIG. 2 is a functional configuration diagram of the information processing device 200 in the first embodiment.

Referring to FIG. 2, the functional configuration of the information processing device 200 in the first embodiment will be described.

The information processing device 200 includes a search keyword input unit 210, a conversion keyword group acquisition unit 220, an encrypted keyword group generation unit 230, a search request unit 240, a search result output unit 250, a processing device communication unit 280, and a processing device storage unit 290.

The processing device storage unit 290 (an example of a corresponding keyword storage unit) stores data to be used in the information processing device 200.

A conversion rule table 291, encryption key data 292, or decryption key data 293 is an example of data to be stored in the processing device storage unit 290.

The conversion rule table 291 (an example of corresponding keyword data) is data defining a conversion keyword group generated by associating a search keyword with one or more conversion keywords (corresponding keywords). For example, the conversion rule table 291 is data defining a plurality of search keywords and also defining as a conversion keyword group one or more conversion keywords for each search keyword.

The search keyword input unit 210 inputs a search keyword (search keyword input process).

The conversion keyword group acquisition unit 220 (an example of a corresponding keyword group acquisition unit) obtains from the conversion rule table 291 stored in the processing device storage unit 290 a conversion keyword group corresponding to the search keyword input by the search keyword input unit 210 (corresponding keyword group acquisition process).

Using the encryption key data 292, the encrypted keyword group generation unit 230 encrypts conversion keywords included in the conversion keyword group obtained by the conversion keyword group acquisition unit 220, thereby generating an encrypted keyword group (encrypted keyword group generation process).

The search request unit 240 (an example of a search request data transmission unit and a search response data receiving unit) transmits to the server device 300 through the processing device communication unit 280 search request data including the encrypted keyword group generated by the encrypted keyword group generation unit 230 (search request data transmission process).

The search request unit 240 receives search response data transmitted by the server device 300 (search response data receiving process).

Using the decryption key data 293, the search result output unit 250 decrypts encrypted data included in the search response data received by the search request unit 240, and outputs as a search result search data obtained by decryption (search result output process).

The processing device communication unit 280 performs data communication.

For example, the processing device communication unit 280 transmits search request data to the server device 300, and receives search response data from the server device 300.

The processing device communication unit 280 also receives the conversion rule table 291 from the conversion rule management device 400, and stores the received conversion rule table 291 in the processing device storage unit 290.

Figure 3:
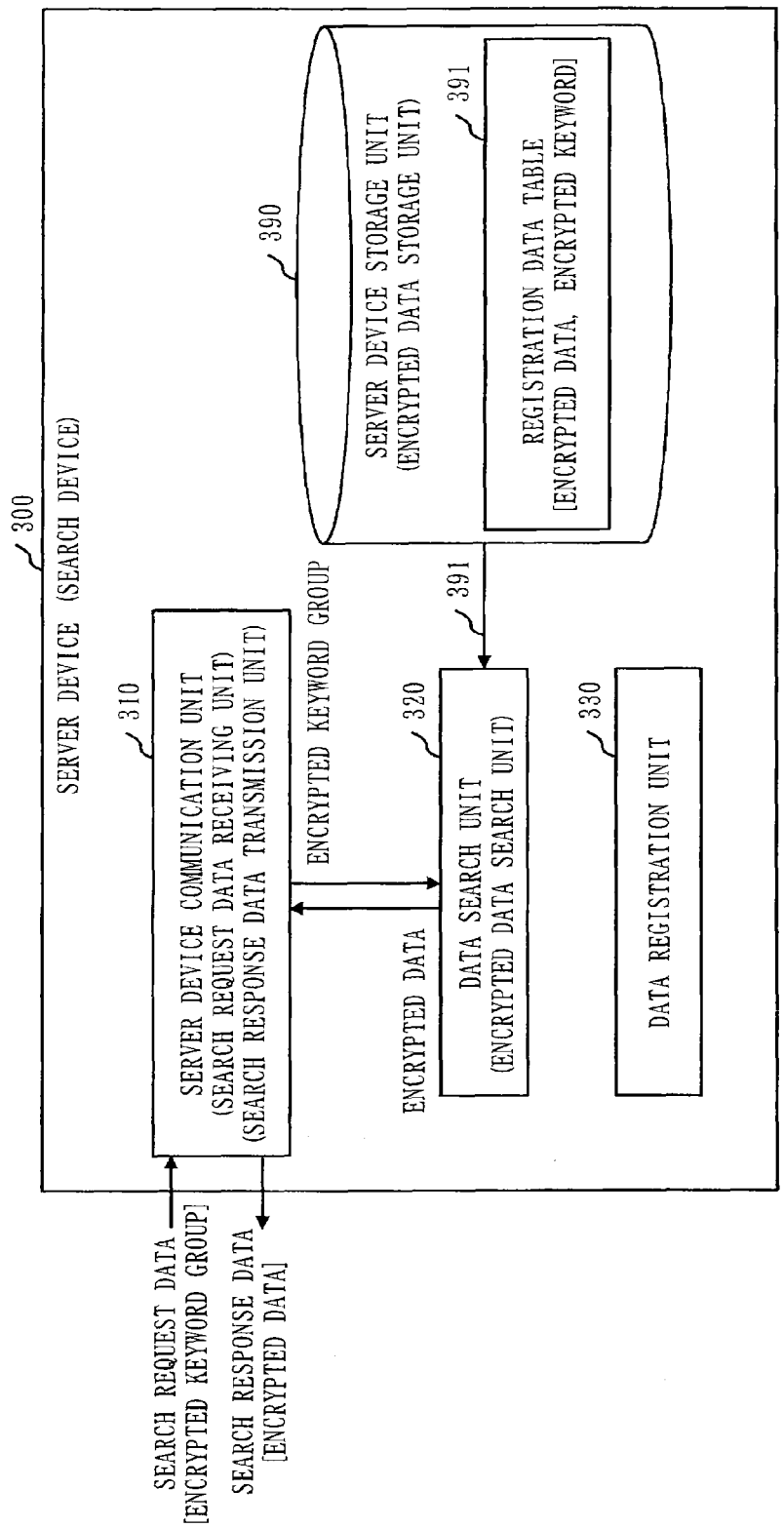
FIG. 3 is a functional configuration diagram of a server device 300 in the first embodiment.

FIG. 3 shows a functional configuration of the server device 300 in the first embodiment.

Referring to FIG. 3, the functional configuration of the server device 300 in the first embodiment will be described.

The server device 300 includes a server device communication unit 310, a data search unit 320, a data registration unit 330, and a server device storage unit 390.

The server device storage unit 390 (an example of an encrypted data storage unit) stores data to be used in the server device 300.

A registration data table 391 is an example of data to be stored in the server device storage unit 390.

The registration data table 391 is data associating encrypted data with an encrypted keyword, the encrypted data being encrypted search data and the encrypted keyword being an encrypted conversion keyword. For example, the registration data table 391 is data associating each encrypted data generated by encrypting each search data with an encrypted keyword generated by encrypting a specific conversion keyword.

The server device communication unit 310 (an example of a search request data receiving unit and a search response data transmission unit) performs data communication.

For example, the server device communication unit 310 receives search request data transmitted by the information processing device 200 (search request data receiving process).

The server device communication unit 310 also transmits search response data including encrypted data obtained by the data search unit 320 (search response data transmission process).

The server device communication unit 310 also receives registration request data transmitted by the data registration device 500 (registration request data receiving process).

Based on the search request data received by the server device communication unit 310, the data search unit 320 obtains from the registration data table 391 encrypted data corresponding to a search key using as the search key an encrypted keyword included in an encrypted keyword group in the search request data (data search process).

The data registration unit 330 sets in the registration data table 391 registration data (encrypted data, encrypted keyword) included in the registration request data received by the server device communication unit 310 (data registration process).

Figure 4:
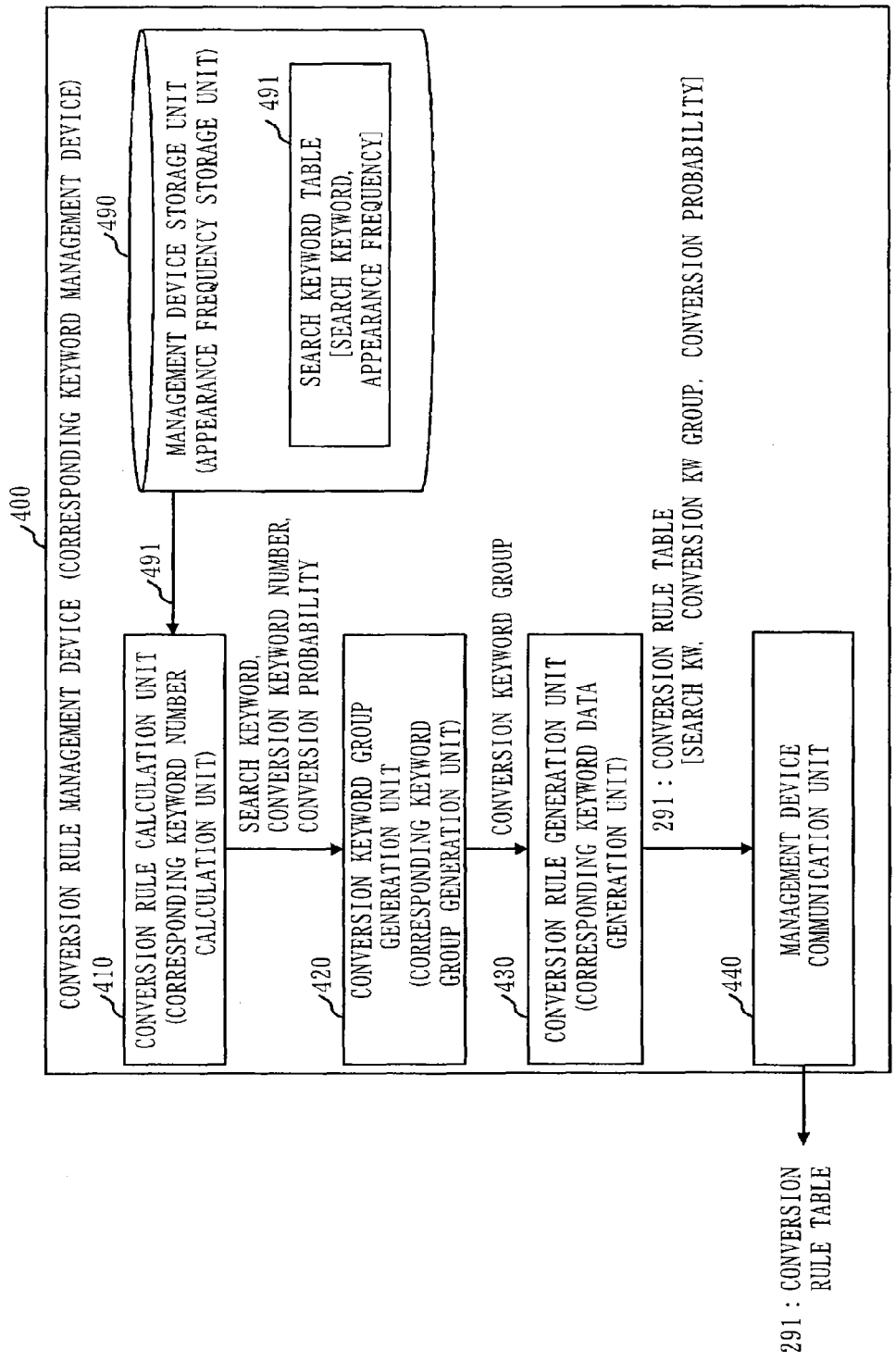
FIG. 4 is a functional configuration diagram of a conversion rule management device 400 in the first embodiment.

FIG. 4 is a functional configuration diagram of the conversion rule management device 400 in the first embodiment.

Referring to FIG. 4, the functional configuration of the conversion rule management device 400 in the first embodiment will be described.

The conversion rule management device 400 (corresponding keyword management device) includes a conversion rule calculation unit 410, a conversion keyword group generation unit 420, a conversion rule generation unit 430, a management device communication unit 440, and a management device storage unit 490.

The management device storage unit 490 stores data to be used in the conversion rule management device 400.

A search keyword table 491 is an example of data to be stored in the management device storage unit 490.

The search keyword table 491 (an example of appearance frequency data) is data defining search keywords and defining as an appearance frequency of a specific search keyword a rate of search data to be associated with the specific search keyword.

The conversion rule calculation unit 410 (an example of a corresponding keyword number calculation unit) calculates as a conversion keyword number the number of conversion keywords to be associated with each search keyword, according to the appearance frequency of each search keyword defined in the search keyword table 491 (corresponding keyword number calculation process).

Based on the appearance frequency of each search keyword defined in the search keyword table 491, the conversion rule calculation unit 410 calculates as a conversion probability (corresponding keyword selection rate) a rate at which each conversion keyword of the search keyword is selected from the conversion keyword group of the search keyword (corresponding keyword selection rate calculation process).

For example, the conversion rule calculation unit 410 calculates the conversion keyword number and the conversion probability as described below.

The conversion rule calculation unit 410 calculates the conversion keyword number of each search keyword such that the appearance frequency of each search keyword after being divided by the conversion keyword number is uniform.

The conversion rule calculation unit 410 calculates the greatest common divisor of appearance frequencies of the search keywords, and calculates as the conversion keyword number of each search keyword a value obtained by dividing the appearance frequency of each search keyword by the greatest common divisor.

For each search keyword, the conversion rule calculation unit 410 calculates as the conversion probability an inverse number of the conversion keyword number.

The conversion keyword group generation unit 420 (an example of a corresponding keyword group generation unit) generates as a conversion keyword group the same number of conversion keywords as the conversion keyword number calculated by the conversion rule calculation unit 410 (corresponding keyword group generation process).

The conversion rule generation unit 430 (an example of a corresponding keyword data generation unit) generates the conversion rule table 291 (an example of corresponding keyword data and corresponding keyword selection rate data) by associating each search keyword with a conversion keyword group and conversion probabilities (corresponding keyword data generation process).

The management device communication unit 440 performs data communication.

For example, the management device communication unit 440 transmits the conversion rule table 291 generated by the conversion rule generation unit 430 to the information processing device 200 and the data registration device 500.

Figure 5:
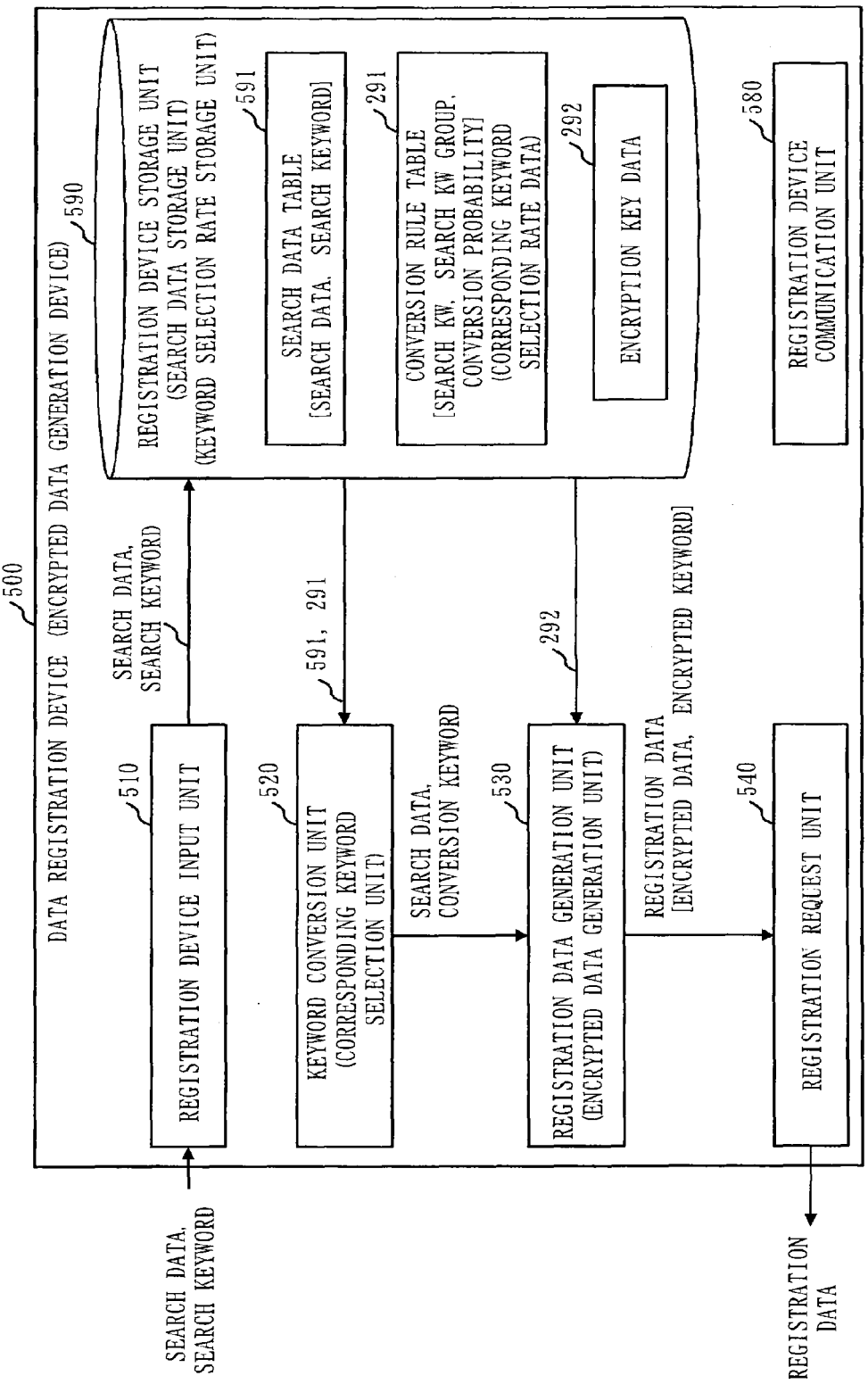
FIG. 5 is a functional configuration diagram of a data registration device 500 in the first embodiment.

FIG. 5 is a functional configuration diagram of the data registration device 500 in the first embodiment.

Referring to FIG. 5, the functional configuration of the data registration device 500 in the first embodiment will be described.

The data registration device 500 (an example of an encrypted data generation device) includes a registration device input unit 510, a keyword conversion unit 520, a registration data generation unit 530, a registration request unit 540, a registration device communication unit 580, and a registration device storage unit 590.

The registration device storage unit 590 (an example of a search data storage unit and a keyword selection rate storage unit) stores data to be used in the data registration device 500.

A search data table 591, the conversion rule table 291, or the encryption key data 292 is an example of data to be stored in the registration device storage unit 590.

The search data table 591 is data associating search data with a search keyword.

The keyword conversion unit 520 (an example of a corresponding keyword selection unit) obtains from the conversion rule table 291 a conversion keyword group corresponding to each search keyword included in the search data table 591.

According to the conversion probabilities included in the conversion rule table 291, the keyword conversion unit 520 selects at least any one of the conversion keywords included in the obtained conversion keyword group (corresponding keyword selection process).

Using the encryption key data 292, the registration data generation unit 530 (an example of an encrypted data generation unit) encrypts each search data included in the search data table 591, thereby generating encrypted data (encrypted data generation process).

Using the encryption key data 292, the registration data generation unit 530 encrypts the conversion keyword selected by the keyword conversion unit 520, thereby generating an encrypted keyword (encrypted keyword generation process).

The registration request unit 540 transmits to the server device 300 through the registration device communication unit 580 registration request data that is set by associating the encrypted data and the encrypted keyword generated by the registration data generation unit 530 (registration request process).

The registration device communication unit 580 performs data communication.

For example, the registration device communication unit 580 transmits registration request data to the server device 300.

Figure 6:
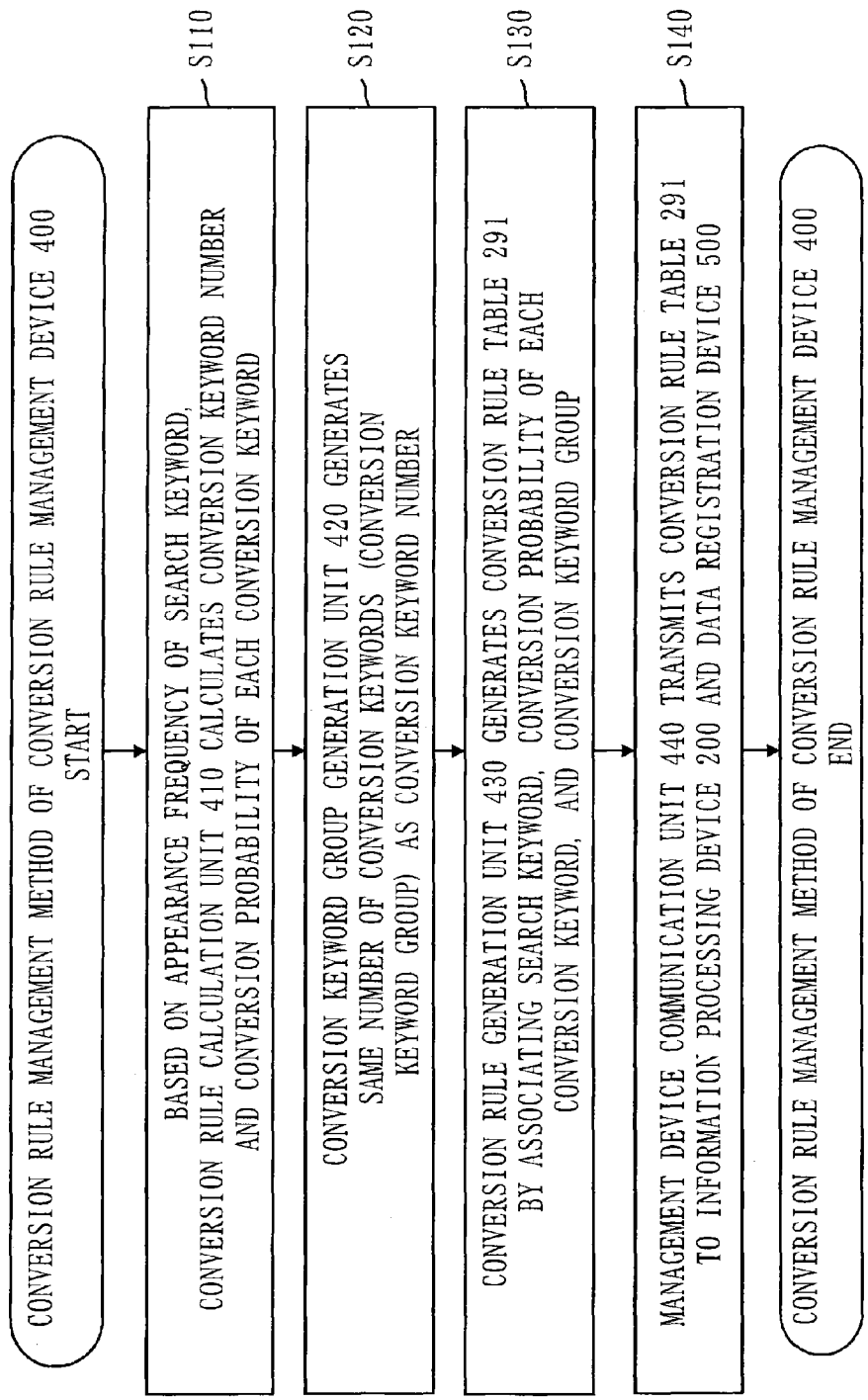
FIG. 6 is a flowchart illustrating a conversion rule management method of the conversion rule management device 400 in the first embodiment.

FIG. 6 is a flowchart illustrating a conversion rule management method of the conversion rule management device 400 in the first embodiment.

Referring to FIG. 6, the conversion rule management method of the conversion rule management device 400 in the first embodiment will be described.

First, the conversion rule management method of the conversion rule management device 400 will be described in outline.

Based on the appearance frequency of each search keyword, the conversion rule calculation unit 410 calculates the conversion keyword number and the conversion probability of each conversion keyword (S110).

The conversion keyword group generation unit 420 generates the same number of conversion keywords as the conversion keyword number (conversion keyword group) (S120).

The conversion rule generation unit 430 generates the conversion rule table 291 by associating each search keyword with a conversion keyword group and conversion probabilities of respective conversion keywords (S130).

The management device communication unit 440 transmits the conversion rule table 291 to the information processing device 200 and the data registration device 500 (S140).

The conversion rule management method of the conversion rule management device 400 will now be described in detail.

In S110, the conversion rule calculation unit 410 obtains the search keyword table 491 from the management device storage unit 490. The search keyword table 491 is prestored in the management device storage unit 490.

FIG. 7 is a diagram showing the search keyword table 491 in the first embodiment.

As shown in FIG. 7, the search keyword table 491 is data associating each search keyword with an appearance frequency.

An appearance frequency indicates a rate of search data for which a corresponding search keyword is used as a search key. For example, when a search keyword "Company A" is used as a search key for 25 out of 100 pieces of search data, the appearance frequency of the search keyword "Company A" is "25% (=25/100)".

Referring back to FIG. 6, the description of S110 continues.

In S110, based on the search keyword table 491, the conversion rule calculation unit 410 calculates as the "conversion keyword number" a frequency division number such that the appearance frequencies of the search keywords after being divided are equal.

Further, the conversion rule calculation unit 410 calculates as the "conversion probability" an inverse number of the conversion keyword number.

For example, the search keyword table 491 shown in FIG. 7 defines the appearance frequency of a search keyword "Company A" as "25%", the appearance frequency of a search keyword "Company B" as "15%", and the appearance frequency of each of other search keywords as "5%".

In this case, if the appearance frequency "25%" of the search keyword "Company A" is divided by 5 and the appearance frequency "15%" of the search keyword "Company B" is divided by 3, appearance frequencies after being divided are all equal, being "5%".

Accordingly, the conversion rule calculation unit 410 calculates frequency division number "5" as the conversion keyword number of the search keyword "Company A", frequency division number "3" as the conversion keyword number of the search keyword "Company B", and frequency division number "1" as the conversion keyword number of each of the other search keywords.

The conversion rule calculation unit 410 also calculates conversion probability "1/5" of the search keyword "Company A", conversion probability "1/3" of the search keyword "Company B", and conversion probability "1/1" of each of the other search keywords.

For example, the conversion rule calculation unit 410 calculates the conversion keyword numbers and the conversion probabilities using the greatest common divisor of appearance frequencies.

Figure 8:
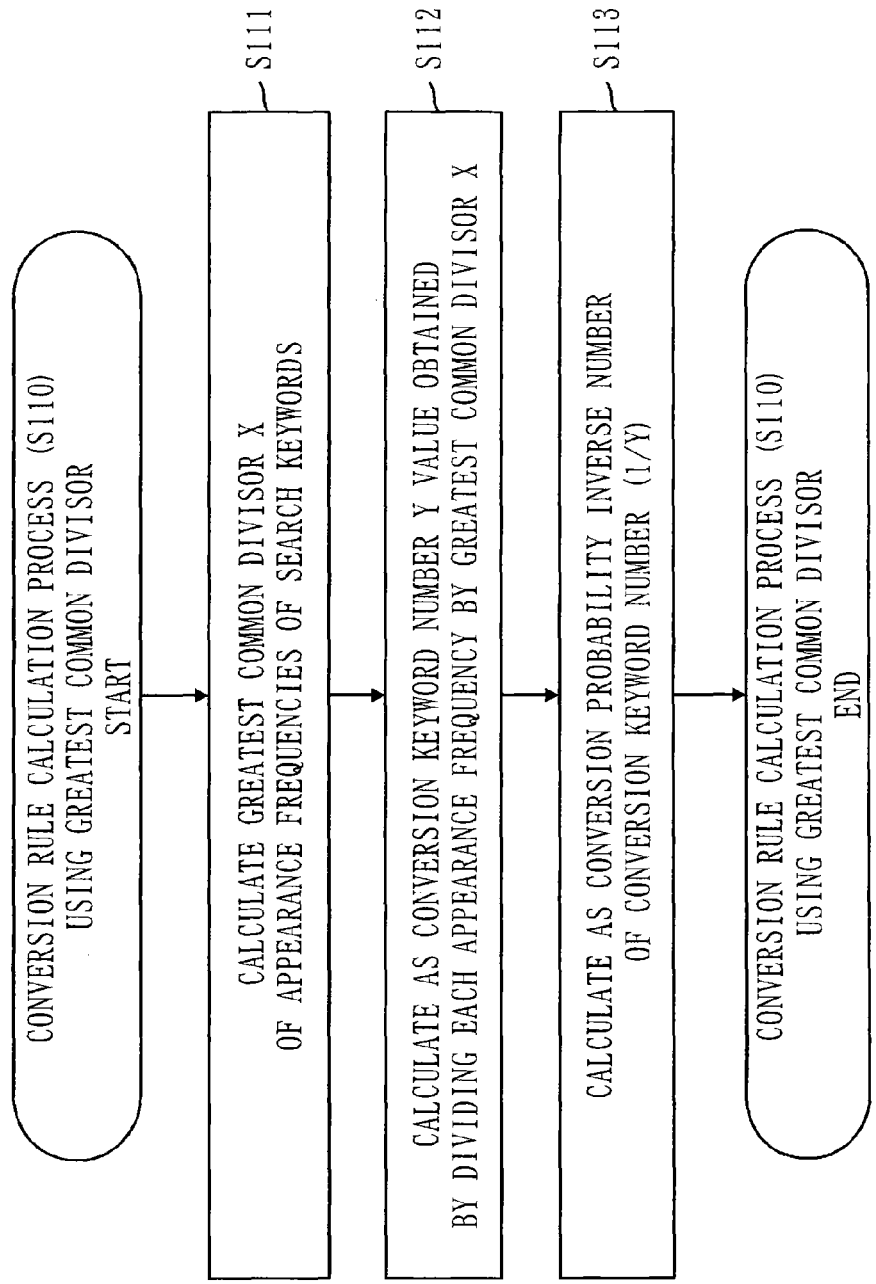
FIG. 8 is a flowchart illustrating an example of a conversion rule calculation process (S110) in the first embodiment.

FIG. 8 is a flowchart illustrating an example of a conversion rule calculation process (S110) in the first embodiment.

Referring to FIG. 8, the conversion rule calculation process (S110) will be described in which the conversion keyword numbers and the conversion probabilities are calculated using the greatest common divisor of appearance frequencies.

In S111, based on the appearance frequencies of the search keywords set in the search keyword table 491, the conversion rule calculation unit 410 calculates the greatest common divisor of the appearance frequencies.

For example, in the case of the search keyword table 491 shown in FIG. 7, the greatest common divisor of the appearance frequencies is "5%".

After S111, processing proceeds to S112.

In S112, the conversion rule calculation unit 410 divides the appearance frequency of each search keyword by the greatest common divisor. A value obtained by this division is the conversion keyword number.

For example, in the case of FIG. 7, the conversion keyword number of the search keyword "Company A" is "5 (=25%÷5%)" obtained by dividing the appearance frequency "25%" by the greatest common divisor "5%".

After S112, processing proceeds to S113.

In S113, the conversion rule calculation unit 410 calculates as the conversion probability an inverse number of the conversion keyword number for each search keyword.

For example, in the case of FIG. 7, the conversion probability of the search keyword "Company A" is inverse number "1/5" of the conversion keyword number "5".

S113 completes the conversion rule calculation process (S110).

Referring back to FIG. 6, the description of the conversion rule management method continues.

After S110, processing proceeds to S120.

In S120, the conversion keyword group generation unit 420 generates the same number of conversion keywords as the conversion keyword number for each search keyword. The same number of conversion keywords as the conversion keyword number will be hereinafter referred to as a "conversion keyword group".

For example, when the conversion keyword number of the search keyword "Company A" is "5", the conversion keyword group generation unit 420 generates a conversion keyword group of "Company A-1", "Company A-2", "Company A-3", "Company A-4", and "Company A-5" by adding serial numbers at the end of the search keyword "Company A".

Note that a conversion keyword not including a search keyword may be used. For example, a conversion keyword may be a combination of randomly selected characters, numerical values, symbols and so on. A one-way function may be used to generate a conversion keyword.

After S120, processing proceeds to S130.

In S130, the conversion rule generation unit 430 generates the conversion rule table 291 by associating each search keyword set in the search keyword table 491 with the conversion probabilities calculated in S110 and the conversion keyword group generated in S120.

FIG. 9 is a diagram showing the conversion rule table 291 in the first embodiment.

As shown in FIG. 9, the conversion rule table 291 is data associating search keywords, conversion probabilities, and conversion keywords.

The conversion rule table 291 shown in FIG. 9 is generated based on the search keyword table 491 shown in FIG. 7. That is, the appearance frequencies of the conversion keywords are equal, being "5%", as explained with reference to FIG. 7.

Referring back to FIG. 6, the description of the conversion rule management method continues.

After S130, processing proceeds to S140.

In S140, the management device communication unit 440 transmits the conversion rule table 291 generated in S130 to the information processing device 200 and the data registration device 500.

The processing device communication unit 280 of the information processing device 200 receives the conversion rule table 291, and stores the received conversion rule table 291 in the processing device storage unit 290.

The registration device communication unit 580 of the data registration device 500 also receives the conversion rule table 291, and stores the received conversion rule table 291 in the registration device storage unit 590.

S140 completes the process of the conversion rule management method.

Figure 10:
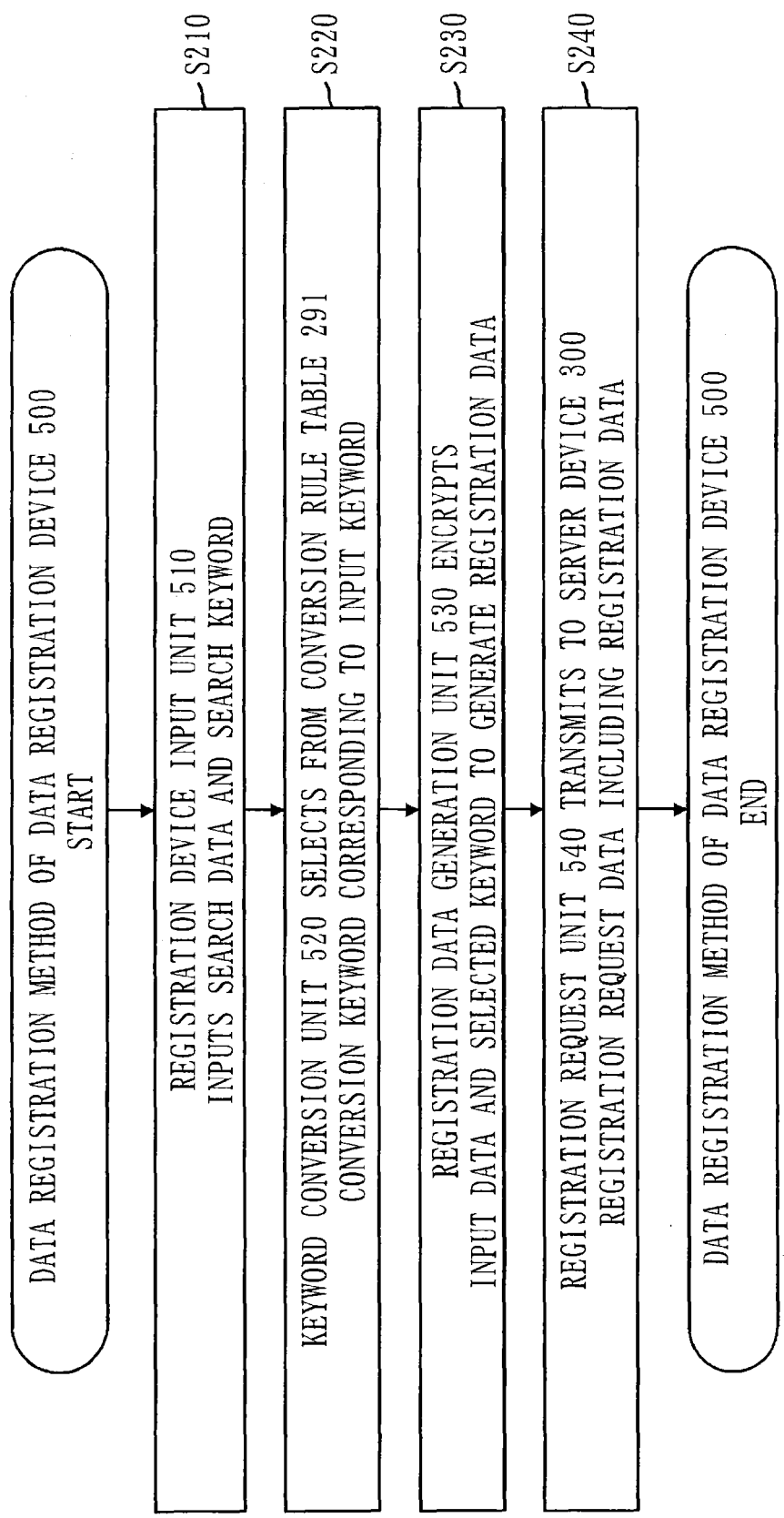
FIG. 10 is a flowchart illustrating a data registration method of the data registration device 500 in the first embodiment.

FIG. 10 is a flowchart illustrating a data registration method of the data registration device 500 in the first embodiment.

Referring to FIG. 10, the data registration method of the data registration device 500 in the first embodiment will be described.

First, the data registration method of the data registration device 500 will be described in outline.

The registration device input unit 510 inputs search data and a search keyword (S210).

The keyword conversion unit 520 selects from the conversion rule table 291 a conversion keyword corresponding to the input keyword (S220).

The registration data generation unit 530 encrypts the input data and the selected keyword, thereby generating registration data (S230).

The registration request unit 540 transmits registration request data including the registration data to the server device 300 (S240).

The data registration method of the data registration device 500 will now be described in detail.

In S210, using an input device such as a keyboard or a mouse, an administrator specifies to the data registration device 500 a combination of search data and a search keyword. A numerical value such as an age, an attribute such as a gender, a character string such as a name, and a file such as a document are examples of search data.

The registration device input unit 510 inputs from the input device the combination of search data and the search keyword specified by the administrator.

Note that a plurality of combinations of search data and a search keyword may be prestored in the registration device storage unit 590, and the registration device input unit 510 may input each combination of search data and a search keyword from the registration device storage unit 590.

The search data and the search keyword input in S210 will be hereinafter respectively referred to as the "input data" and the "input keyword".

After S210, processing proceeds to S220.

In S220, the keyword conversion unit 520 obtains the conversion rule table 291 (see FIG. 9) from the registration device storage unit 590.

The keyword conversion unit 520 obtains from the conversion rule table 291 a conversion keyword group corresponding to the same search keyword as the input keyword.

The keyword conversion unit 520 randomly selects one conversion keyword from the obtained conversion keyword group. Note that a selection probability of selecting each conversion keyword depends on the conversion probability set in the conversion rule table 291.

The conversion keyword selected in S220 will be hereinafter referred to as the "selected keyword".

For example, in the case of the conversion rule table 291 shown in FIG. 9, one of the conversion keywords "Company A-1", "Company A-2", "Company A-3", "Company A-4", and "Company A-5" is selected for the input keyword "Company A". A probability of each conversion keyword being selected (conversion probability) is "1/5".

That is, when there are 100 pieces of the input keyword "Company A", "Company A-1", "Company A-2", "Company A-3", "Company A-4" and "Company A-5" are respectively selected approximately 20 times.

After S220, processing proceeds to S230.

In S230, the registration data generation unit 530 obtains the encryption key data 292 from the registration device storage unit 590. The encryption key data 292 is generated by a predetermined key generation algorithm and is prestored in the registration device storage unit 590.

Using the encryption key data 292, the registration data generation unit 530 encrypts the input data by a predetermined encryption algorithm. The encrypted input data will be hereinafter referred to as the "encrypted data".

Using the encryption key data 292, the registration data generation unit 530 encrypts the selected keyword by a predetermined encryption algorithm (deterministic encryption). The encrypted selected keyword will be hereinafter referred to as the "encrypted keyword".

Note that encryption key data used for encrypting the selected keyword may be different from the encryption key data used for encrypting the input data. An encryption algorithm used for encrypting the selected keyword may be different from the encryption algorithm used for encrypting the input data.

A combination of the encrypted data and the encrypted keyword will be hereinafter referred to as "registration data".

After S230, processing proceeds to S240.

In S240, the registration request unit 540 generates registration request data including the registration data generated in S230, and transmits the generated registration request data to the server device 300 through the registration device communication unit 580. Note that the registration request unit 540 may transmit to the server device 300 registration request data including a plurality of registration data.

The server device communication unit 310 of the server device 300 receives the registration request data, and registers (sets) the registration data included in the received registration request data in the registration data table 391.

S240 completes the process of the data registration method.

Figure 11:
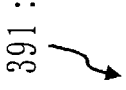
FIG. 11 is a diagram showing a registration data table 391 in the first embodiment.

FIG. 11 is a diagram showing the registration data table 391 in the first embodiment.

As shown in FIG. 11, the registration data table 391 (also referred to as a database) is data including a plurality of combinations of an encrypted keyword and encrypted data (registration data). That is, the registration data table 391 is data associating each encrypted keyword with each encrypted data.

"E(x)" denotes data of encrypted "x".

As described above, the conversion keywords are selected according to the uniform conversion probabilities defined in the conversion rule table 291 (FIG. 10, S220). Thus, when a sufficient number of pieces of registration data are registered in the registration data table 391, the number of each encrypted keyword included in the registration table 391 is approximately uniform.

Encrypted keywords and encrypted data may be stored in respectively different tables or storage devices. For example, there may be a table associating encrypted keywords and data IDs of encrypted data and a table associating data IDs and encrypted data.

FIG. 12 is a diagram showing registration frequencies of encrypted keywords in the first embodiment.

For example, when conversion keywords are selected based on the conversion rule table 291 shown in FIG. 9 and the selected conversion keywords are encrypted, the rates (registration frequencies) of the encrypted keywords registered in the registration data table 391 are equalized to "5%" (see FIG. 12).

Therefore, when frequency analysis is performed on encrypted keywords based on the registration data table 391 stored in the server device 300, a search keyword cannot be guessed from an encrypted keyword. This is because there is practically no difference in the registration frequencies of the encrypted keywords.

Figure 13:
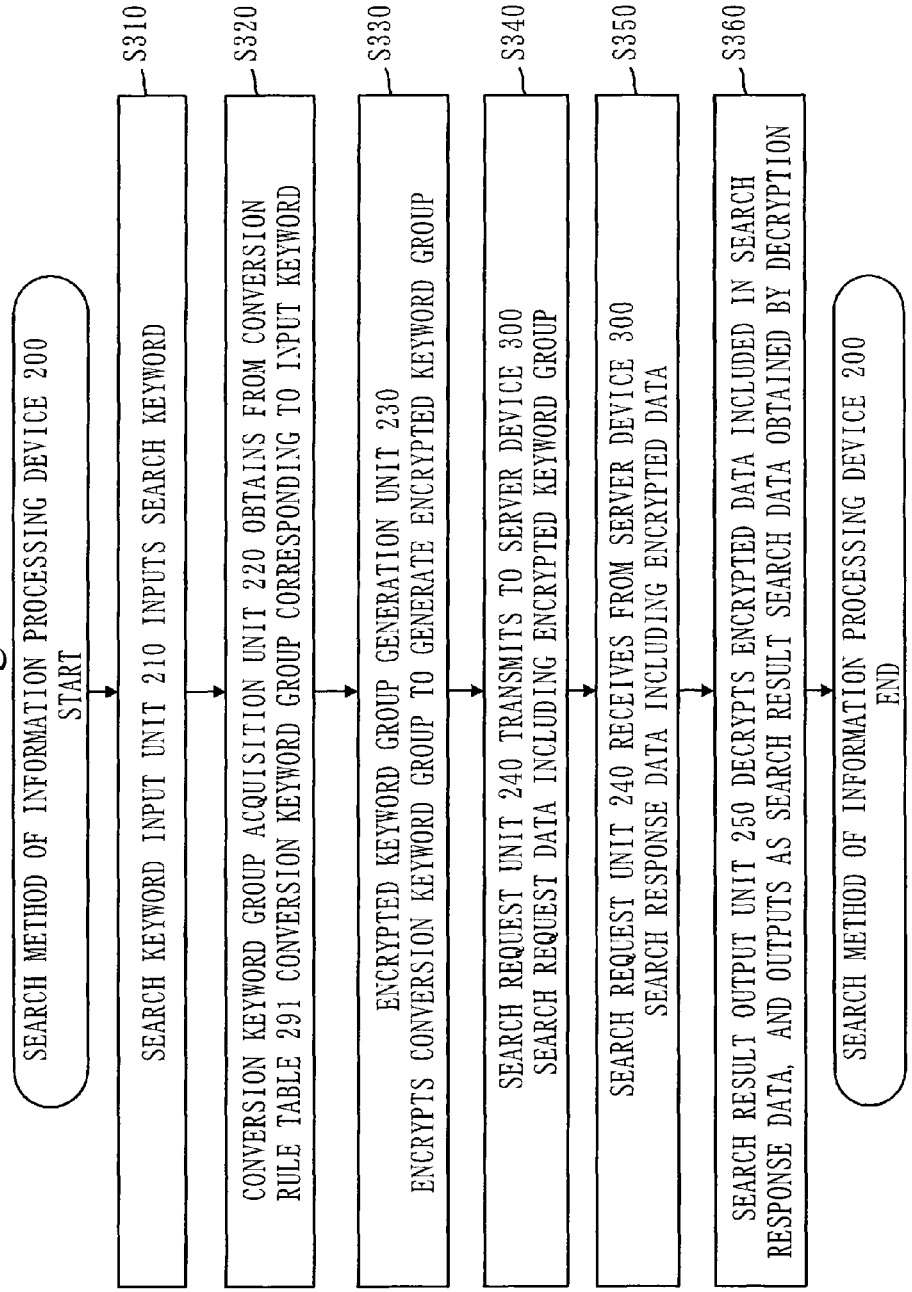
FIG. 13 is a flowchart illustrating a search method of the information processing device 200 in the first embodiment.

FIG. 13 is a flowchart illustrating a search method of the information processing device 200 in the first embodiment.

Referring to FIG. 13, the search method of the information processing device 200 in the first embodiment will be described.

First, the search method of the information processing device 200 will be described in outline.

The search keyword input unit 210 inputs a search keyword (S310).

The conversion keyword group acquisition unit 220 obtains from the conversion rule table 291 a conversion keyword group corresponding to the input keyword (S320).

The encrypted keyword group generation unit 230 encrypts the conversion keyword group, thereby generating an encrypted keyword group (S330).

The search request unit 240 transmits search request data including the encrypted keyword group to the server device 300 (S340).

The search request unit 240 receives search response data including encrypted data from the server device 300 (S350).

The search result output unit 250 decrypts the encrypted data included in the search response data, and outputs as a search result search data obtained by decryption (S360).

The search method of the information processing device 200 will now be described in detail.

In S310, using an input device such as a keyboard or a mouse, a user specifies a search keyword to the information processing device 200.

The search keyword input unit 210 inputs from the input device the search keyword specified by the user.

The search keyword input in S310 will be hereinafter referred to as the "input keyword".

After S310, processing proceeds to S320.

In S320, the conversion keyword group acquisition unit 220 obtains a conversion keyword group corresponding to the input keyword from the conversion rule table 291 stored in the processing device storage unit 290.

For example, the conversion keyword group acquisition unit 220 obtains from the conversion rule table 291 shown in FIG. 9 the conversion keyword group of "Company A-1", "Company A-2", "Company A-3", "Company A-4", and "Company A-5" corresponding to the input keyword "Company A".

After S320, processing proceeds to S330.

In S330, the encrypted keyword group generation unit 230 obtains the encryption key data 292 from the processing device storage unit 290.

Using the encryption key data 292, the encrypted keyword group generation unit 230 encrypts each conversion keyword included in the conversion keyword group obtained in S320 by a predetermined encryption algorithm (deterministic encryption).

Note that the encryption key data 292 and the encryption algorithm used in S330 are the same as the encryption key data and the encryption algorithm used for encrypting a search keyword in generation of registration data (S230 of FIG. 10).

An encrypted conversion keyword will be hereinafter referred to as an "encrypted keyword" and data consisting of encrypted keywords will be referred to as an "encrypted keyword group".

After S330, processing proceeds to S340.

In S340, the search request unit 240 generates search request data including the encrypted keyword group generated in S330, and transmits the generated search request data to the server device 300 through the processing device communication unit 280.

For example, in the case of the conversion rule table 291 shown in FIG. 9, the search request data for the input keyword "Company A" includes an encrypted keyword group of "E (Company A-1)", "E (Company A-2)", "E (Company A-3)", "E (Company A-4)", and "E (Company A-5)".

After S340, processing proceeds to S350.

In S350, the server device 300 searches for encrypted data based on the search request data, and transmits to the information processing device 200 search response data including one or a plurality of pieces of encrypted data found as a result of searching.

The search request unit 240 receives through the processing device communication unit 280 the search response data transmitted from the server device 300.

After S350, processing proceeds to S360.

In S360, the search result output unit 250 obtains the decryption key data 293 from the processing device storage unit 290.

Using the decryption key data 293, the search result output unit 250 decrypts each encrypted data included in the search response data by a predetermined decryption algorithm.

The search result output unit 250 outputs each search data obtained by decryption as a search result for the input keyword. For example, the search result output unit 250 displays the search result on a display device.

Note that the decryption key data 293 used in S360 is data paired with the encryption key data used for encrypting search data (S203 of FIG. 10). The decryption algorithm used in S360 is an algorithm paired with the encryption algorithm used for encrypting search data.

S360 completes the search method of the information processing device 200.

Figure 14:
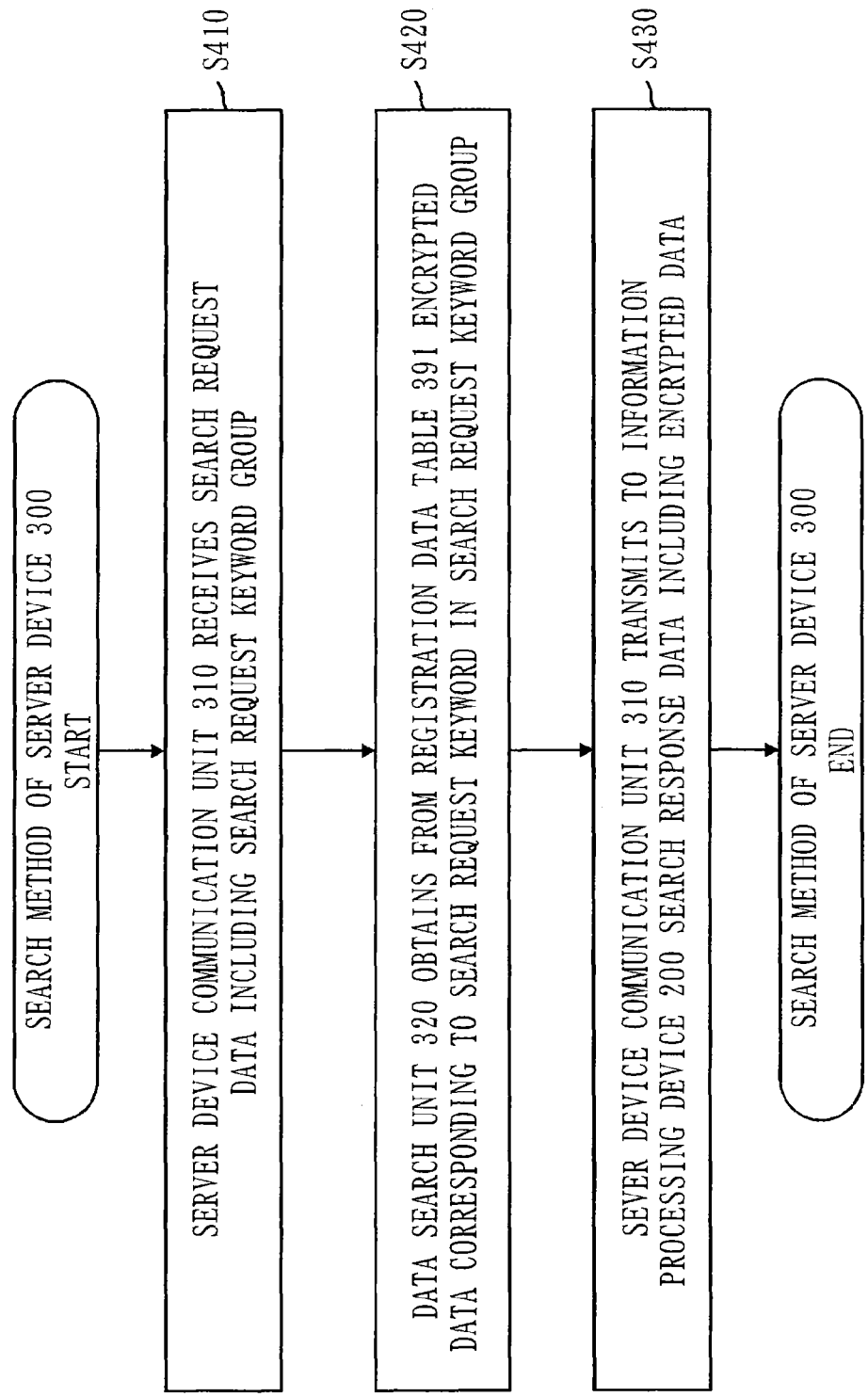
FIG. 14 is a flowchart illustrating a search method of the server device 300 in the first embodiment.

FIG. 14 is a flowchart illustrating a search method of the server device 300 in the first embodiment.

Referring to FIG. 14, the search method of the server device 300 in the first embodiment will be described.

First, the search method of the server device 300 will be described in outline.

The server device communication unit 310 receives search request data including a search request keyword group (S410).

The data search unit 320 obtains from the registration data table 391 encrypted data corresponding to a search request keyword in the search request keyword group (S420).

The server device communication unit 310 transmits to the information processing device 200 search response data including the encrypted data (S430).

The search method of the server device 300 will now be described in detail.

In S410, the server device communication unit 310 receives search request data transmitted from the information processing device 200.

An encrypted keyword group (encrypted keywords) included in the search request data will be hereinafter referred to as a "search request keyword group (search request keywords)".

After S410, processing proceeds to S420.

In S420, the data search unit 320 searches through the registration data table 391 (see FIG. 11) using as a search key each search request keyword included in the search request keyword group. That is, the data search unit 320 searches through the registration data table 391 and identifies an encrypted keyword that matches at least any one of the search request keywords (OR search).

An encrypted keyword that matches a search key will be referred to as a "target keyword".

Then, the data search unit 320 obtains from the registration data table 391 encrypted data corresponding to each target keyword.

For example, in the case of the registration data table 391 shown in FIG. 11, the data search unit 320 obtains encrypted data "E (data a)", "E (data b)", and "E (data d)" for a search request keyword group of "E (Company A-1)", "E (Company A-2)", "E (Company A-3)", "E (Company A-4)", and "E (Company A-5)".

The search process (S420) may be accelerated using a conventional search technique (for example, a technique using a hash table).

After S420, processing proceed to S430.

In S430, the data search unit 320 generates search response data including each encrypted data obtained in S420.

Then, the server device communication unit 310 transmits to the information processing device 200 the search response data generated by the data search unit 320.

S430 completes the search method of the server device 300.

Figure 15:
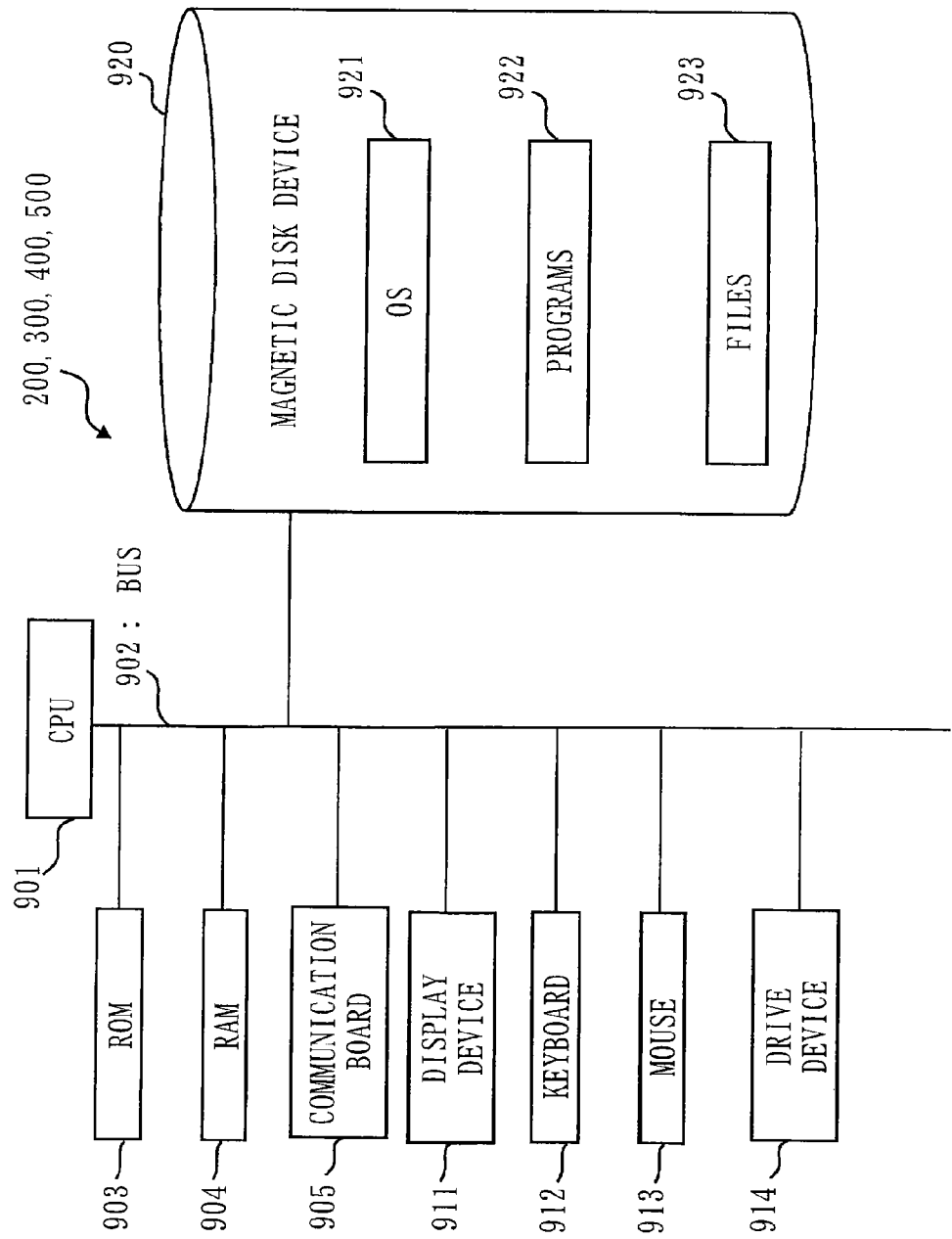
FIG. 15 is a diagram showing an example of hardware resources of the searchable encryption system 100 in the first embodiment.

FIG. 15 is a diagram showing an example of hardware resources of the searchable encryption system 100 in the first embodiment.

In FIG. 15, each of the information processing device 200, the server device 300, the conversion rule management device 400, and the data registration device 500 includes a CPU 901 (Central Processing Unit). The CPU 901 is connected through a bus 902 with a ROM 903, a RAM 904, a communication board 905, a display device 911, a keyboard 912, a mouse 913, a drive device 914, and a magnetic disk device 920, and controls these hardware devices. The drive device 914 is a device that reads from and writes to storage media such as an FD (Flexible Disk Drive), a CD (Compact Disc), and a DVD (Digital Versatile Disc).

The communication board 905 is connected with a communication network such as a LAN (Local Area Network), the Internet, or a telephone line in a wired or wireless fashion.

The magnetic disk device 920 stores an OS 921 (operating system), programs 922, and files 923.

The programs 922 include programs that execute functions described as "... unit" in the embodiments. The programs are read and executed by the CPU 901. That is, each program causes a computer to function as " ... unit" or causes the computer to execute a procedure or a method of" ... unit".

The files 923 include various types of data (inputs, outputs, determination results, calculation results, processing results, etc.) used in " ... unit" described in the embodiments.

In the embodiments, arrows included in the configuration diagrams and the flowcharts mainly denote inputs/outputs of data and signals.

In the embodiments, what is described as "... unit" may be " ... circuit", "... device" or " ... equipment" and may also be "... step", "... procedure", or "... process". That is, what is described as " ... unit" may be implemented by any of firmware, software, hardware, or a combination thereof.

In the first embodiment, the searchable encryption system 100 such as described below, for example, has been discussed.

The information processing device 200 performs a search without revealing data and keywords to the server device 300.

Since deterministic encryption is used instead of probabilistic encryption, it is only necessary to search for exactly matching binary data in searching. With this arrangement, a faster search can be performed using existing search techniques.

Deterministic encryption is an encryption scheme in which there is a one-to-one correspondence between plaintext data and encrypted data. That is, encrypted data is uniquely determined by plaintext data.

Probabilistic encryption is an encryption scheme in which plaintext data has a plurality of corresponding encrypted data. Encrypted data is not uniquely determined by plaintext data.

The searchable encryption system 100 does not require dummy data which is required in Patent Literature 1. Thus, storage areas can be used efficiently.

The conversion rule table 291 is generated for the purpose of providing resistance to frequency analysis by an attacker with respect to the frequency information (appearance frequency, registration frequency) of a given keyword (for example, an encrypted keyword).

The conversion rule table 291 may be encrypted for enhanced security.

The information processing device 200, the server device 300, the conversion rule management device 400, or the data registration device 500 may be combined or separated.

For example, the information processing device 200 may include functions of the conversion rule management device 400 or the data registration device 500.

Encrypted data may be associated with one or a plurality of encrypted keywords. When encrypted data is associated with a plurality of encrypted keywords, the encrypted data is treated as matching data for a search if the search request keyword group includes all the encrypted keywords, or if the search request keyword group includes at least any one of the encrypted keywords.

One encrypted keyword may be associated with a plurality of encrypted data. In this case, if the search request keyword group includes the encrypted keyword, all or at least any of the plurality of encrypted data is treated as matching data for a search.

The encryption key data 292 may be input from an IC card or the like, or may be automatically generated based on user information such as a password and biological information.

Second Embodiment

An embodiment of the searchable encryption system 100 that satisfies "k-anonymity" will be described.

Features that are different from the first embodiment will be mainly described hereinafter. Features not described are substantially the same as described in the first embodiment.

"k-anonymity" is a property of making frequency analysis of encrypted keywords difficult by providing "k" or more encrypted keywords having the same registration frequency.

The configuration of devices of the searchable encryption system 100 and the functional configuration of each device are the same as described in the first embodiment (see FIGS. 1 to 5).

Note that the conversion rule calculation unit 410 of the conversion rule management device 400 calculates the conversion keyword number and the conversion probability as described below.

The conversion rule calculation unit 410 calculates as the conversion keyword number (corresponding keyword number) of each search keyword a division number based on which the appearance frequency of each search keyword is divided, such that "k" or more search keywords have the same appearance frequency, "k" being a predetermined anonymity number.

The conversion rule calculation unit 410 calculates as the conversion probability (corresponding keyword selection rate) of each search keyword a division rate based on which the appearance frequency of each search keyword is divided (divided frequency to be described later).

For example, the conversion rule calculation unit 410 calculates the conversion keyword number and the conversion probability as described below.

The conversion rule calculation unit 410 selects as a computing frequency the "k"th greatest appearance frequency from the appearance frequencies of the search keywords, where k is the predetermined anonymity number.

The conversion rule calculation unit 410 subtracts the computing frequency one or more times from each appearance frequency greater than or equal to the computing frequency.

The conversion rule calculation unit 410 selects as a new computing frequency the "k"th greatest appearance frequency from the appearance frequencies of the search keywords after subtraction.

The conversion rule calculation unit 410 subtracts the new computing frequency one or more times from each appearance frequency greater than or equal to the new computing frequency.

For each search keyword, the conversion rule calculation unit 410 calculates as the conversion keyword number the number of times each of the computing frequencies is subtracted from the appearance frequency.

For each search keyword, the conversion rule calculation unit 410 calculates as the conversion probability a rate of each computing frequency with respect to the original appearance frequency.

Figure 16:
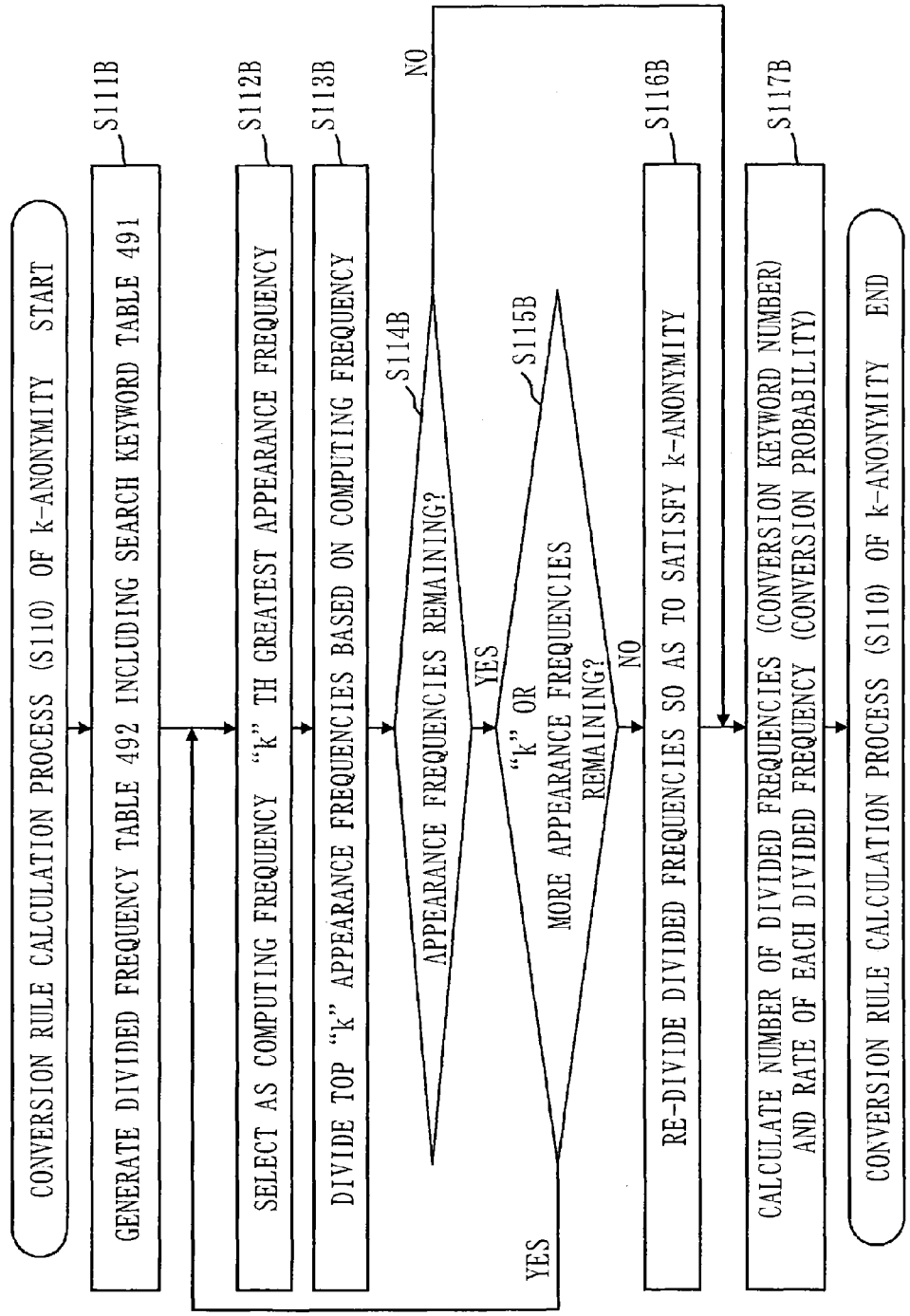
FIG. 16 is a flowchart illustrating a conversion rule calculation process (S110) in a second embodiment.

FIG. 16 is a flowchart illustrating a conversion rule calculation process (S110) in the second embodiment.

Referring to FIG. 16, the conversion rule calculation process (S110) in the second embodiment will be described.

In S111B, the conversion rule calculation unit 410 generates a divided frequency table 492 including a search keyword table 491.

Figure 17:
FIG. 17 is a diagram showing a search keyword table 491 and a divided frequency table 492 in the second embodiment.

FIG. 17 is a diagram showing the search keyword table 491 and the divided frequency table 492 in the second embodiment.

As shown in FIG. 17, the search keyword table 491 is data associating each "search keyword" with an "appearance frequency". Note that appearance frequencies are represented as integer ratios.

The divided frequency table 492 is data including the search keyword table 491, and is data associating each "search keyword" with an "appearance frequency" and a "divided frequency".

Referring back to FIG. 16, the description of the conversion rule calculation process (S110) continues.

After S111B, processing proceeds to S112B.

In S112B, the conversion rule calculation unit 410 selects the "k"th greatest appearance frequency from the divided frequency table 492.

"k" denotes an anonymity number "k" defined as a parameter value of "k-anonymity".

For example, in the case of "3-anonymity (k=3)", the conversion rule calculation unit 410 selects the third greatest appearance frequency "28" from the divided frequency table 492 shown in FIG. 17.

The appearance frequency selected in S111B will be hereinafter referred to as the "computing frequency".

After S112B, processing proceeds to S113B.

In S113B, the conversion rule calculation unit 410 selects from the divided frequency table 492 an appearance frequency greater than or equal to the computing frequency. The appearance frequency selected in S113B will be hereinafter referred to as the "target frequency".

The conversion rule calculation unit 410 subtracts the computing frequency from the target frequency, thereby updating the target frequency, and sets the computing frequency as a divided frequency.

FIG. 18 is a schematic diagram of the conversion rule calculation process (S110) in the second embodiment.

In the divided frequency table 492 shown in (1) of FIG. 18, the computing frequency for "3-anonymity (k=3)" is "28", and target frequencies (appearance frequencies greater than or equal to 28) are "40", "35" and "28".

As shown in (2) of FIG. 18, the conversion rule calculation unit 410 subtracts the computing frequency "28" from the target frequency "40", thereby updating the target frequency to "12 (=40−28)".

The conversion rule calculation unit 410 sets the computing frequency "28" as a divided frequency.

In this way, the target frequency "40" is divided into a target frequency "12" after subtraction and a divided frequency "28".

Likewise, the conversion rule calculation unit 410 divides the target frequency "35" into a target frequency "7" after subtraction and a divided frequency "28", and divides the target frequency "28" into a target frequency "0" after subtraction and a divided frequency "28".

Note that when the target frequency is a value greater than or equal to n times the computing frequency (n being an integer of 1 or more), the conversion rule calculation unit 410 updates the target frequency by subtracting the computing frequency n times from the target frequency, and sets the n number of the computing frequency as divided frequencies.

For example, when the target frequency is "60", the conversion rule calculation unit 410 subtracts the computing frequency "28" twice from the target frequency "60", thereby updating the target frequency to "4 (=60−28−28)", and sets two of the computing frequency "28" as divided frequencies. In this way, the target frequency "60" is divided into a target frequency "4" after subtraction and two divided frequencies "28" and "28".

Referring back to FIG. 16, the description of the conversion rule calculation process (S110) continues.

After S113B, processing proceeds to S114B.

In S114B, the conversion rule calculation unit 410 determines whether or not there remains an appearance frequency other than "0" in the divided frequency table 492.

If there remains an appearance frequency other than "0" (YES), processing proceeds to S115B.

If there is no longer any appearance frequency other than "0" (NO), processing proceeds to S117B.

In S115B, the conversion rule calculation unit 410 determines whether or not there remain "k" or more appearance frequencies other than "0" in the divided frequency table 492.

If there remain "k" or more appearance frequencies other than "0" (YES), processing returns to S112B. For example, in the divided frequency table 492 shown in (2) of FIG. 18, there remain 7 appearance frequencies other than "0". That is, there remain 3 (=k) or more appearance frequencies other than "0". Thus, processing returns to S112B.

If there remain only less than "k" appearance frequencies other than "0" (NO), processing proceeds to S116B.

In S116B, the conversion rule calculation unit 410 further divides the divided frequencies set in the divided frequency table 492 such that k-anonymity is satisfied.

Processing in S116B will be separately described in detail.

After S116B, processing proceeds to S117B.

In S117B, the conversion rule calculation unit 410 calculates as the "conversion keyword number" the number of divided frequencies set in the divided frequency table 492.

The conversion rule calculation unit 410 calculates as the "conversion probability" a rate of each divided frequency.

Specific examples of calculation methods of the conversion keyword number and the conversion probability will be separately described.

S117B completes the conversion rule calculation process (S110).

FIGS. 19 to 21 are schematic diagrams of the conversion rule calculation process (S110) in the second embodiment.

FIG. 22 is a diagram showing a conversion rule table 291 in the second embodiment.

Referring to FIGS. 19 to 22, a specific example of processing if there remain "k" or more appearance frequencies other than "0" in S115B (YES).

In FIG. 19, the conversion rule calculation unit 410 selects as a computing frequency the third (="k"th) greatest appearance frequency "22" from the divided frequency table 492 (2) (S112B).

Next, the conversion rule calculation unit 410 selects as target frequencies appearance frequencies "27", "23", "22" and "22" greater than or equal to the computing frequency "22". Then, the conversion rule calculation unit 410 divides the target frequency "27" into "5" and "22", divides the target frequency "23" into "1" and "22", and divides the target frequency "22" into "0" and "22" (S113B).

In this way, the divided frequency table 492 (3) shown in of FIG. 19 is generated.

In the divided frequency table 492 (3), there remain 3 (=k) or more appearance frequencies other than "0". Thus, processing returns to S112B (S114B-S115B). The description continues.

In FIG. 20, the conversion rule calculation unit 410 selects as a computing frequency the third (="k"th) greatest appearance frequency "7" from the divided frequency table 492 (3) (S112B).

Next, the conversion rule calculation unit 410 selects as target frequencies appearance frequencies "21", "12", and "7" greater than or equal to the computing frequency "7". Then, the conversion rule calculation unit 410 divides the target frequency "21" into "0" and 3 pieces of "7", divides the target frequency "12" into "5" and "7", and divides the target frequency "7" into "0" and "7" (S113B). In this way, the divided frequency table 492 (4) shown in FIG. 20 is generated.

In the divided frequency table 492 (4), there remain 3 (=k) or more appearance frequencies other than "0". Thus, processing returns to S112B (S114B-S115B). The description continues.

In FIG. 21, the conversion rule calculation unit 410 selects as a computing frequency the third (="k"th) greatest appearance frequency "1" from the divided frequency table 492 (4) (S112B).

Next, the conversion rule calculation unit 410 selects as target frequencies appearance frequencies "5", "5", and "1" greater than or equal to the computing frequency "1". Then, the conversion rule calculation unit 410 divides the target frequency "5" into "0" and 5 pieces of "1", and divides the target frequency "1" into "0" and "1" (S113B).

In this way, the divided frequency table 492 (5) shown in FIG. 21 is generated.

In the divided frequency table 492 (5), there is no longer any appearance frequency other than "0" (S114B). Thus, the conversion rule calculation unit 410 calculates the conversion keyword number and the conversion probabilities of each search keyword as described below (S117B).

In the divided frequency table 492 (5), a search keyword "Sato" has divided frequencies "28", "7", and 5 pieces of "1".

Referring to the divided frequency table 492 (5), the conversion rule calculation unit 410 calculates as the conversion keyword number of the search keyword "Sato" the number of divided frequencies of the search keyword "Sato", the number being "7".

Further, the conversion rule calculation unit 410 calculates as the conversion probability of each conversion keyword of the search keyword "Sato" a rate of each divided frequency of the search keyword "Sato", which is "28/40", "7/40", and "1/40" respectively.

The conversion rule calculation unit 410 calculates the conversion keyword number and the conversion probabilities of each of other search keywords in the same manner.

Based on the divided frequency table 492 (5) shown in FIG. 21, the conversion rule table 291 is generated.

For example, associated with the search keyword "Sato", the same number of conversion keywords as the conversion keyword number "7", namely "Sato-1 to Sato-7", are set in the conversion rule table 291.

Associated with respective conversion keywords of the search keyword "Sato", the conversion probabilities "28/40", "7/40", and "1/40" are set in the conversion rule table 291.

FIG. 23 is a diagram showing registration frequencies of encrypted keywords in the second embodiment.

For example, when conversion keywords are selected based on the conversion rule table 291 shown in FIG. 22 and the selected conversion keywords are encrypted, the encrypted keywords are registered in the registration data table 391 at registration rates as shown in FIG. 23.

For example, as encrypted keywords having the registration frequency "28", there are 3 (=k) types of encrypted keywords, namely "E (Sato-1)", "E (Suzuki-1)", and "E (Takahashi-1)". Thus, it is not possible to identify which of these 3 encrypted keywords represents data that corresponds to the search keyword "Sato (or Suzuki or Takahashi)".

That is, "3-anonymity" is secured, so that frequency analysis of the encrypted keywords is difficult.

Likewise, other registration frequencies, namely "22", "7", and "1", are also common to 3 (=k) or more types of encrypted keywords. Thus, "3-anonymity" is secured, so that frequency analysis of the encrypted keywords is difficult.

FIG. 24 is a diagram showing another example of the search keyword table 491 and the divided frequency table 492 in the second embodiment.

Figure 25:
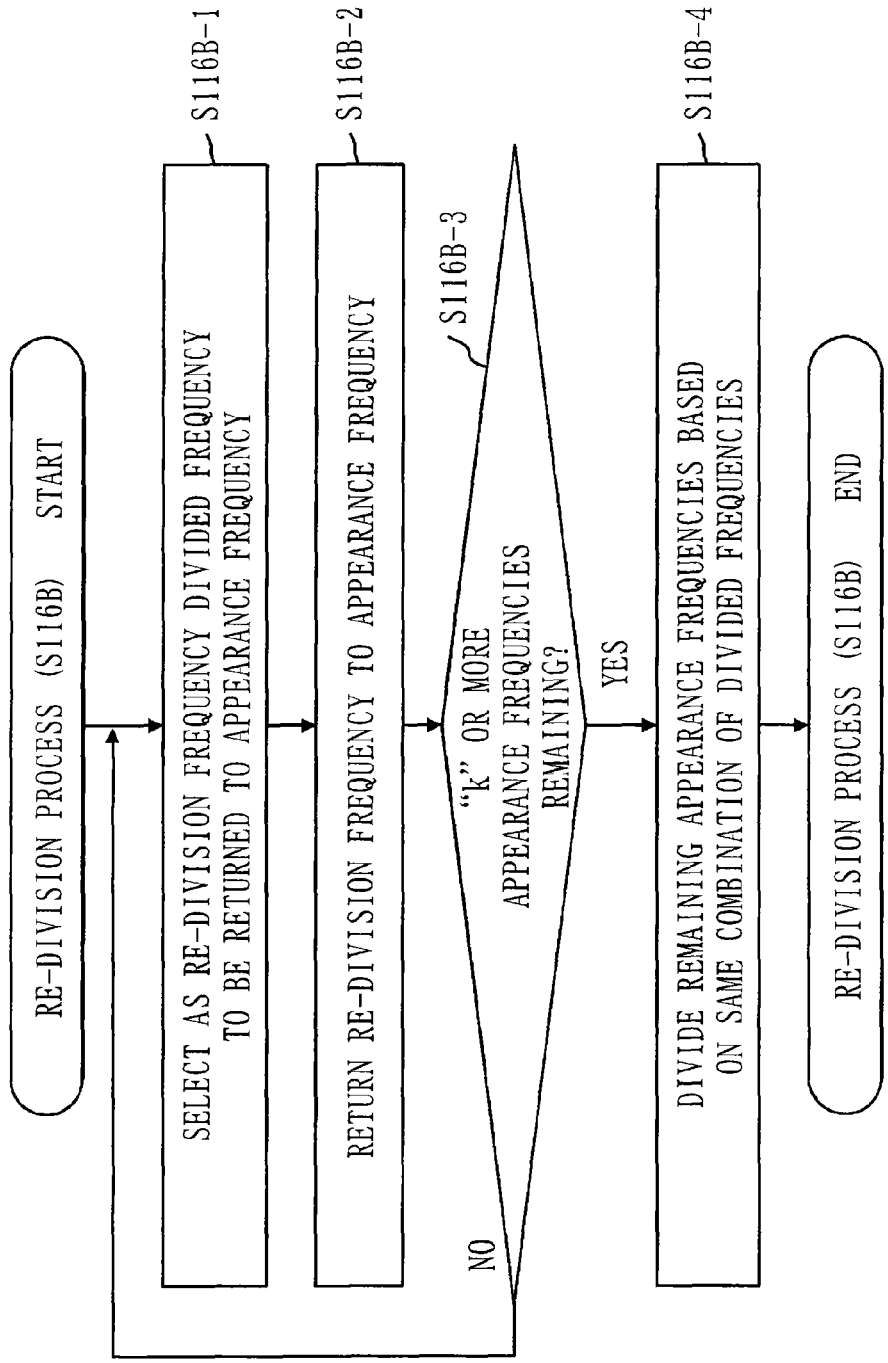
FIG. 25 is a flowchart illustrating a re-division process (S116B) of the conversion rule calculation process (S110) in the second embodiment.

FIG. 25 is a flowchart illustrating a re-division process (S116B) of the conversion rule calculation process (S110) in the second embodiment.

FIGS. 26 and 27 are schematic diagrams of the re-division process (S116B) in the second embodiment.

Referring to FIGS. 24 to 27, description will be directed to the re-division process (S116B) when there remain only less than "k" appearance frequencies other than "0" in S115B (NO).

When the appearance frequency of each search keyword is divided in S112B to S115B (see FIG. 16) based on the search keyword table 491 shown in FIG. 24, the divided frequency table 492 (1) of FIG. 24 is obtained. In the divided frequency table 492 (1), there remain 2 appearance frequencies other than "0", namely 2 pieces of "5". That is, there remain only less than 3 (=k) appearance frequencies other than "0", so that the re-division process (S116B) shown in FIG. 25 is executed.

In S116B-1 (see FIG. 25), based on the divided frequency table 492, the conversion rule calculation unit 410 calculates the number of divided frequencies included in each divided frequency group for each divided frequency group consisting of divided frequencies having the same value. The number of divided frequencies included in a divided frequency group will be hereinafter referred to as "group frequency number".

The divided frequency table 492 (1) shown in FIG. 24 includes three groups: a "28" divided frequency group consisting of 3 divided frequencies "28", a "22" divided frequency group consisting of 4 divided frequencies "22" and a "7" divided frequency group consisting of 5 divided frequencies "7". In this case, the group frequency number of the "28" divided frequency group is "3", the group frequency number of the "22" divided frequency group is "4", and the group frequency number of the "7" divided frequency group is "5".

The conversion rule calculation unit 410 determines as a "division candidate group" a divided frequency group having a group frequency number exceeding the anonymity number "k". This is to satisfy "k-anonymity".

In the case of the divided frequency table 492 (1) shown in FIG. 24, the "22" divided frequency group and the "7" divided frequency group are division candidate groups.

The conversion rule calculation unit 410 selects as a "re-division frequency group" a division candidate group consisting of the smallest divided frequencies.

In the case of the divided frequency table 492 (1) shown in FIG. 24, the "7" divided frequency group is a re-division frequency group.

Note that the conversion rule calculation unit 410 may select as a re-division frequency group a division candidate group consisting of the greatest divided frequencies, or may select as a re-division frequency group a division candidate group having the greatest (or smallest) group frequency number, or may randomly select a re-division frequency group from division candidate groups.

The conversion rule calculation unit 410 selects as a "re-division frequency" a divided frequency to be returned to an appearance frequency from a plurality of divided frequencies included in the re-division frequency group.

For example, the conversion rule calculation unit 410 selects a re-division frequency to satisfy a condition that the number of search keywords corresponding to the remaining divided frequencies in the re-division frequency group is equal to or more than the anonymity number "k".

In the case of the divided frequency table 492 (1) shown in FIG. 24, the conversion rule calculation unit 410 selects as a re-division frequency the divided frequency "7" of a search keyword "Nakamura".

After S116B-1, processing proceeds to S116B-2.

In S116B-2, the conversion rule calculation unit 410 adds the re-division frequency to the appearance frequency from which the re-division frequency has been divided (subtracted), thereby updating the appearance frequency, and deletes the re-division frequency. As a result, the re-division frequency returns from the "divided frequency" to the "appearance frequency".

For example, when the re-division frequency "7" is returned to the appearance frequency in the divided frequency table 492 (1) shown in FIG. 26, the divided frequency table 492 (2) is obtained.

After S116B-2, processing proceeds to S116B-3.

In S116B-3, the conversion rule calculation unit 410 determines whether or not there remain "k" or more appearance frequencies other than "0" in the divided frequency table 492.

If there remain "k" or more appearance frequencies other than "0" (YES), processing proceeds to S116B-4.

If there remain only less than "k" appearance frequencies other than "0" (NO), processing returns to S116B-1.

In S116B-4, the conversion rule calculation unit 410 determines a combination of divided frequencies for dividing each remaining appearance frequency (≠0) in the divided frequency table 492, and divides each appearance frequency according to the determined combination of divided frequencies.

Note that the conversion rule calculation unit 410 divides each appearance frequency using all the divided frequencies constituting the combination of divided frequencies.

That is, each appearance frequency is divided according to the same combination of divided frequencies as other appearance frequencies. In this way, "k-anonymity" can be satisfied.

In the divided frequency table 492 (2) shown in FIG. 27, there remain appearance frequencies "5", "5", and "7". Each of the appearance frequencies "5", "5", and "7" can be divided by a combination of "3" and "2". When the appearance frequencies "5", "5", and "7" are divided into divided frequencies "3" and "2", the divided frequency table 492 (3) is obtained.

For example, the conversion rule calculation unit 410 generates a plurality of candidate combinations by dividing the appearance frequencies by all possible combinations (searching for all possible division combinations), and calculates the total number of divided frequencies when the appearance frequencies are divided according to each of the generated candidate combinations. Then, the conversion rule calculation unit 410 selects a candidate combination with the smallest total number of divided frequencies as the combination of divided frequencies, and divides each of the appearance frequencies according to the selected combination of divided frequencies. This combination of divided frequencies is a combination that produces the smallest average value of conversion keyword numbers. With this arrangement, the average value of the number of search request keywords (encrypted keywords) included in search request data can be minimized.

For example, the appearance frequencies "5", "5", and "7" can be divided by a combination of "4" and "1", a combination of "3" and "1", or a combination of "2" and "1". Note that the total number of divided frequencies is the smallest when the appearance frequencies are divided by a combination of "3" and "2". Thus, the conversion rule calculation unit 410 divides the appearance frequencies "5", "5", and "7" into divided frequencies "3" and "2".

Note that the conversion rule calculation unit 410 may calculate the maximum value of conversion keyword numbers when the appearance frequencies are respectively divided according to each candidate combination, and select a candidate combination with the smallest maximum value of conversion keyword numbers as the combination of divided frequencies. With this arrangement, the maximum value of the number of search request keywords included in search request data can be made small.

S116B-4 completes the re-division process (S116B).

A supplementary description of the conversion rule calculation process (S110) shown in FIG. 16 will be provided.

In S115B (FIG. 16), if there remain "k" or more appearance frequencies other than "0" (YES), divided frequencies may be optimized by performing a process substantially the same as the re-division process (S116B) described in FIG. 25.

Figure 29:
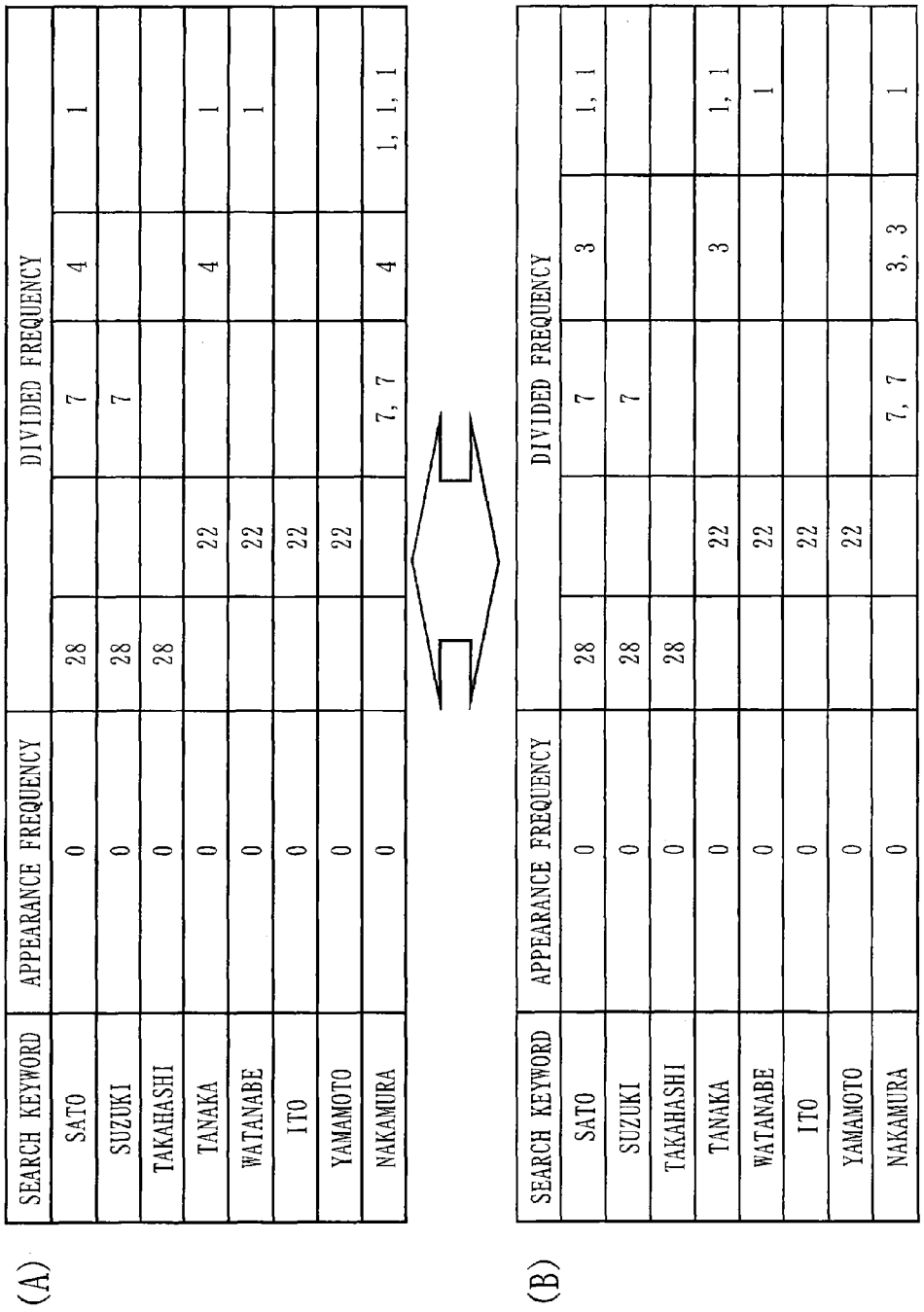
FIG. 29 is a diagram showing optimization of divided frequencies in the second embodiment.

FIGS. 28 to 30 are diagrams showing optimization of divided frequencies in the second embodiment.

Referring to FIGS. 20 and 28 to 30, a specific example the optimization of divided frequencies will be described.

In FIG. 20, more than 3 (=k) divided frequencies "7" are newly set in the divided frequency table 492 (4).

At this time, there remain 3 (=k) or more appearance frequencies other than "0", namely "5", "5" and "1". The third (="k"th) greatest appearance frequency "1" (computing frequency) among the remaining appearance frequencies "5", "5", and "1" is less than or equal to a predetermined frequency threshold (for example, 1).

Accordingly, out of the 5 divided frequencies "7", the conversion rule calculation unit 410 returns one divided frequency "7" of the search keyword "Nakamura" which satisfies "k-anonymity" to the appearance frequency. As a result, the divided frequency table 492 (5) of FIG. 28 is obtained.

The conversion rule calculation unit 410 generates candidate combinations of divided frequencies by dividing the remaining appearance frequencies "7", "5", "5", and "1". Note that each candidate combination of divided frequencies should satisfy "3-anonymity". That is, candidate combinations are generated to satisfy a condition that each divided frequency constituting a candidate combination of divided frequencies is set by being associated with 3 (=k) or more search keywords.

Then, the conversion rule calculation unit 410 selects a combination of divided frequencies from the generated candidate combinations of divided frequencies, and divides each of the appearance frequencies "7" "5", "5" and "1" based on the selected combination of divided frequencies.

The divided frequency table 492 (A) of FIG. 29 shows a division result with the smallest average value of conversion keyword numbers (the smallest total number of divided frequencies), and the divided frequency table 492 (B) of FIG. 29 shows a division result with the smallest maximum value of conversion keyword numbers.

In the divided frequency table 492 (A), the average value of conversion keyword numbers is "2.5", which is smaller than the average value "2.875" of conversion keyword numbers in the divided frequency table 492 (5) shown in FIG. 21.

In the divided frequency table 492 (B), the maximum value of conversion keyword numbers is "5" (search keywords: Sato, Nakamura), which is smaller than the maximum value "7" of conversion keyword numbers (search keyword: Sato) in the divided frequency table 492 (5) shown in FIG. 21.

Further, the conversion rule calculation unit 410 may generate the divided frequency table 492 for each of a plurality of "k-anonymity".

In this case, the conversion rule calculation unit 410 determines each divided frequency table 492 satisfying a predetermined optimization condition from the generated divided frequency tables 492, and selects the divided frequency table 492 having the greatest value of "k" from the divided frequency tables 492 satisfying the predetermined optimization condition (for example, the average value or maximum value of search keyword numbers).

For example, the conversion rule calculation unit 410 generates the divided frequency tables 492 for "3-anonymity", "4-anonymity", and "5-anonymity".

FIG. 30 shows the divided frequency tables 492 for "3-anonymity" and "4-anonymity". The divided frequency table 492 for "5-anonymity" is not illustrated.

The conversion rule calculation unit 410 calculates the average value of search keyword numbers for each of "3-anonymity", "4-anonymity", and "5-anonymity". In the case of FIG. 30, the average value of search keyword numbers for "3-anonymity" is "2.5", and the average value of search keyword numbers for "4-anonymity" is "2.75". It is assumed that the average value of search keyword numbers for "5-anonymity" is "3.5".

The conversion rule calculation unit 410 compares each of the average values "2.5", "2.75", and "3.5" of search keyword numbers with a predetermined optimization condition value "3.0". In this case, the average value "2.5" of search keyword numbers for "3-anonymity" and the average value "2.75" of search keyword numbers for "4-anonymity" are below the optimization condition value "3", satisfying the optimization condition.

Accordingly, from the divided frequency table 492 for "3-anonymity" and the divided frequency table 492 for "4-anonymity", the conversion rule calculation unit 410 selects the divided frequency table 492 for "4-anonymity" which has the greater value of "k".

As described above, the conversion rule calculation unit 410 may optimize the divided frequency table 492.

Other processes (S120-S140) of the conversion rule management method of the conversion rule management device 400 are substantially the same as described in the first embodiment (see FIG. 6).

The data registration method of the data registration device 500, the search method of the information processing device 200, and the search method of the server device 300 are substantially the same as described in the first embodiment (see FIGS. 10, 13, and 14).

In the second embodiment, the searchable encryption system 100 as described below, for example, has been discussed.

In the searchable encryption system 100, "k-anonymity" is defined as a security index, and the conversion rule management device 400 generates conversion rules based on this index.

With this arrangement, it is possible to reduce the size of a search request transmitted from the information processing device 200 to the server device 300 in a search.

k-anonymity means that when an attacker has all information concerning frequency distribution of keywords, conversion rules, and frequency distribution of encrypted keywords and guesses a keyword from an encrypted keyword, there are k or more keywords that may be associated with a given encrypted keyword.

In the searchable encryption system 100, the information processing device 200 can perform a search without revealing data and keywords to the server device 300.

By satisfying the property of k-anonymity, identification of keywords by the server device 300 can be prevented. Furthermore, the size of a search request can be reduced compared to the first embodiment.

For example, when the conversion rule table 291 is generated based on the search keyword table 491 shown in FIG. 17, in the first embodiment 40 conversion keywords having appearance frequency "1" are required for the search keyword "Sato" in order to equalize the appearance frequencies of the conversion keywords. On the other hand, in the second embodiment 7 conversion keywords are required for the search keyword "Sato" as shown in FIG. 22. That is, the conversion keyword number is smaller in the second embodiment, so that the size of search request data is smaller in the second embodiment.

Third Embodiment

An embodiment, different from the second embodiment, of the searchable encryption system 100 that satisfies "k-anonymity" will be described.

Features different from the first and second embodiments will be mainly described hereinafter. Features not described are substantially the same as described in the first and second embodiments.

The configuration of devices of the searchable encryption system 100 and the functional configuration of each device are substantially the same as described in the first embodiment (see FIGS. 1 to 5).

Note that the conversion rule calculation unit 410 of the conversion rule management device 400 calculates the conversion keyword number and the conversion probability as described below.

The conversion rule calculation unit 410 divides the appearance frequency of each search keyword into a plurality of appearance frequencies using exponential values of a predetermined base.

The conversion rule calculation unit 410 calculates as the conversion keyword number (corresponding keyword number) the number of divided appearance frequencies.

The conversion rule calculation unit 410 calculates as the conversion probability (corresponding keyword selection rate) a rate of each divided frequency (appearance frequency after being divided) with respect to the appearance frequency before being divided.

Using an exponential value of the base, the conversion rule calculation unit 410 divides a divided frequency that is common to less than "k" search keywords among the divided frequencies of the search keywords, "k" being a predetermined anonymity number.

Figure 31:
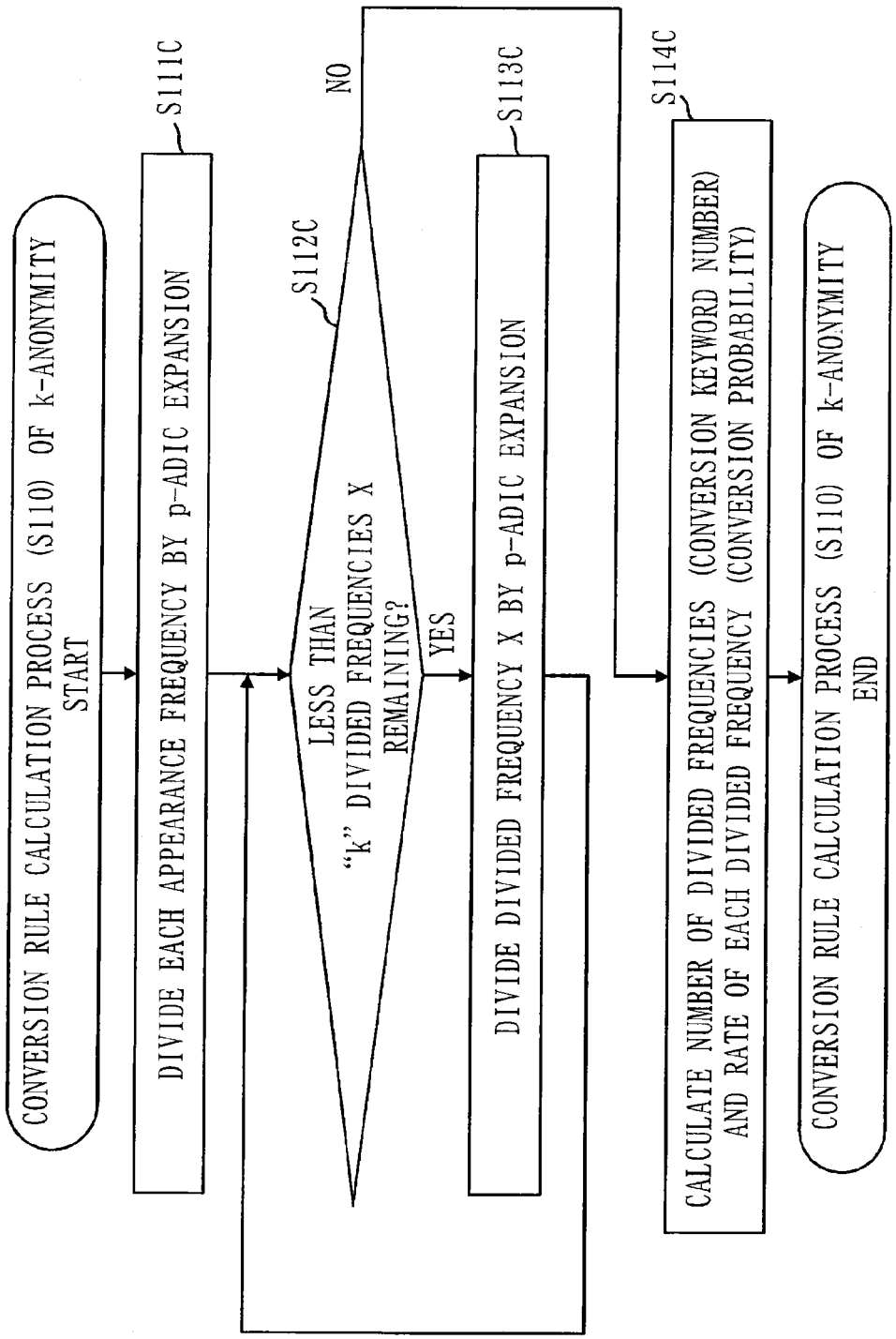
FIG. 31 is a flowchart illustrating a conversion rule calculation process (S110) in a third embodiment.

FIG. 31 is a flowchart of a conversion rule calculation process (S110) in a third embodiment.

FIGS. 32 and 33 are schematic diagrams of the conversion rule calculation process (S110) in the third embodiment.

Referring to FIGS. 31 to 33, the conversion rule calculation process (S110) in the third embodiment will be described.

In S111C (see FIG. 31), using a predetermined base value "p", the conversion rule calculation unit 410 performs p-adic expansion of each appearance frequency set in the divided frequency table 492, and divides each appearance frequency into a plurality of divided frequencies.

In FIG. 32, each appearance frequency set in the divided frequency table 492 (1) can be divided by 2-adic expansion into divided frequencies set in the divided frequency table 492 (2).

For example, an appearance frequency "40" of a search keyword "Sato" is divided into "32" which is the base "2 (=p)" to the power of 5 and "8" which is the base "2" to the power of 3.

Note that each appearance frequency may be divided using an exponential value with a base of other than "2" (for example, 3 or 5).

Referring back to FIG. 31, the description of the conversion rule calculation process (S110) continues.

After S111C, processing proceeds to S112C.

In S112C, based on the divided frequency table 492, the conversion rule calculation unit 410 calculates the number of divided frequencies for each value of divided frequencies. The number of divided frequencies will be hereinafter referred to as a "frequency number".

The conversion rule calculation unit 410 determines whether or not there is any divided frequency having a frequency number less than the anonymity number "k".

If there is a divided frequency having a frequency number less than the anonymity number "k" (YES), processing proceeds to S113C.

If there is no divided frequency having a frequency number less than the anonymity number "k" (NO), processing proceeds to S114C.

In the case of the divided frequency table 492 (2) of FIG. 32, the frequency number of a divided frequency "32" is "2", the frequency number of a divided frequency "16" is "6", the frequency number of a divided frequency "8" is "3", the frequency number of a divided frequency "4" is "5", the frequency number of a divided frequency "2" is "5", and the frequency number of a divided frequency "1" is "4".

In this case, the frequency number "2" of the divided frequency "32" is less than "3 (=k)".

Accordingly, processing proceeds to S113C.

Referring back to FIG. 31, the description continues from S113C.

In S113C, the conversion rule calculation unit 410 divides the divided frequency having the frequency number of less than the anonymity number "k" (hereinafter referred to as a "re-division frequency") by p-adic expansion.

The re-division frequency "32" set in the divided frequency table 492 (2) of FIG. 33 can be divided into "16" which is 2 (=p) to the power of 4. As a result, the divided frequency table 492 (3) is obtained.

Referring back to FIG. 31, the description of the conversion rule calculation process (S110) continues.

After S113C, processing returns to S112C.

In the divided frequency table 492 (3) shown in FIG. 33, the frequency numbers of all the divided frequencies are greater than or equal to "3 (=k)".

Accordingly, after S112C, processing proceeds to S114C (see FIG. 31).

In S114C, based on the divided frequency table 492, the conversion rule calculation unit 410 calculates as the "conversion keyword number" the number of divided frequencies for each conversion keyword, and calculates as the "conversion probability" a rate of each divided frequency.

In the case of the divided frequency table 492 (3) of FIG. 33, the search keyword "Sato" has divided frequencies "16", "16" and "8". Thus, the conversion rule calculation unit 410 calculates as the conversion keyword number of the search keyword "Sato" the number of divided frequencies of the search keyword "Sato", the number being "3".

Further, the conversion rule calculation unit 410 calculates as the conversion probabilities of the conversion keywords of the search keyword "Sato" rates "16/40", "16/40", and "8/40" of the divided frequencies of the search keyword "Sato".

Likewise, the conversion rule calculation unit 410 obtains the conversion keyword numbers and conversion probabilities of other search keywords.

FIG. 34 is a diagram showing a conversion rule table 291 in the third embodiment.

FIG. 35 is a diagram showing registration frequencies of encrypted keywords in the third embodiment.

Based on the divided frequency table 492 (3) shown in FIG. 33, the conversion rule table 291 shown in FIG. 34 is generated.

For example, associated with the search keyword "Sato", the same number of conversion keywords as the conversion keyword number "3", namely "Sato-1 to Sato-3", are set in the conversion rule table 291.

Further, associated with the respective keywords of the search keyword "Sato", conversion probabilities "16/40", "16/40", and "8/40" are set in the conversion rule table 291.

When conversion keywords are selected based on the conversion rule table 291 of FIG. 34 and the selected conversion keywords are encrypted, the encrypted keywords are registered in the registration data table 391 at registration rates shown in FIG. 35.

Each registration frequency is common to 3 (=k) or more types of encrypted keywords. Thus, "3-anonymity" is secured, so that frequency analysis of the encrypted keywords is difficult.

The conversion rule calculation unit 410 may optimize the divided frequency table 492.

For example, the conversion rule calculation unit 410 optimizes the divided frequency table 492 as described below.

Referring to the divided frequency table 492, the conversion rule calculation unit 410 determines as "integration candidates" combinations of divided frequencies satisfying "k-anonymity" even after being integrated.

The conversion rule calculation unit 410 generates the divided frequency table 492 by integrating divided frequencies according to each integration candidate.

The conversion rule calculation unit 410 calculates the average value of conversion keyword numbers (or the maximum value of conversion keyword numbers) for each divided frequency table 492.

The conversion rule calculation unit 410 selects the divided frequency table 492 having the smallest average value of conversion keyword numbers (or the smallest maximum number of conversion keyword numbers).

FIG. 36 is a diagram showing a specific example of optimization of the divided frequency table 492 in the third embodiment.

In the case of the divided frequency table 492 (3) shown in FIG. 36, integration candidates satisfying "3-anonymity" include {16, 8}, {16, 4}, {16, 2}, and {16, 1}. This is because when divided frequencies are integrated by selecting any of the integration candidates, each divided frequency after being integrated is common to 3 (=k) or more search keywords.

For example, when the integration candidate {16, 2} is integrated into a divided frequency "18 (=16+2)", the divided frequency table 492 (4) shown in FIG. 36 is obtained. The average value of conversion keyword numbers in the divided frequency table 492 (4) is "2.75".

When the integration candidate {16, 8} is integrated, the average value of conversion keyword numbers is "3.0". When the integration candidate {16, 4} is integrated, the average value of conversion keyword numbers is "2.75". When the integration candidate {16, 1} is integrated, the average value of conversion keyword numbers is "2.875".

That is, when the integration candidate {16, 2} is integrated, the average value of conversion keyword numbers is the smallest "2.75". Thus, the conversion rule calculation unit 410 selects the divided frequency table 492 (4) in which the integration candidate {16, 2} is integrated. Note that when the integration candidate {16, 4} is integrated, the average value of conversion keyword numbers is also "2.75". Thus, the conversion rule calculation unit 410 may select the divided frequency table 492 in which the integration candidate {16, 4} is integrated.

FIGS. 37 and 38 respectively show the conversion rule table 291 and registration frequencies of encrypted keywords based on the divided frequency table 492 (4) in which the integration candidate {16, 2} is integrated.

The conversion rule calculation unit 410 may randomly select an integration candidate from a plurality of integration candidates, and generate the divided frequency table 492 using the selected integration candidate.

In the above description, the appearance frequencies of search keywords are divided using p-adic expansion. However, the appearance frequencies of search keywords may be divided according to a division rule other than p-adic expansion.

For example, a division rule consisting of a plurality of division numbers "1, 5, 10, 50, 100, 500, . . . " is predefined. Then, the conversion rule calculation unit 410 divides the appearance frequencies of search keywords according to this division rule. In this case, the appearance frequency "28" is divided into "10", "10", "5", "1", "1", and "1".

Other processes (S120-S140) of the conversion rule management method of the conversion rule management device 400 are substantially the same as described in the first embodiment (see FIG. 6).

The data registration method of the data registration device 500, the search method of the information processing device 200, and the search method of the server device 300 are substantially the same as described in the first embodiment (see FIGS. 10, 13, and 14).

Substantially the same effects as in the second embodiment can be obtained by the third embodiment.

Fourth Embodiment

An embodiment will be described in which the conversion keyword number and the conversion probability are calculated using ambiguity of an attacker in guessing a keyword (entropy) as a security index.

Features different from the first to third embodiments will be mainly described hereinafter. Features not described are substantially the same as described in the first to third embodiments.

The configuration of devices of the searchable encryption system 100 and the functional configuration of each device are the same as described in the first embodiment (see FIGS. 1 to 5).

Note that the conversion rule calculation unit 410 of the conversion rule management device 400 calculates the conversion keyword number and the conversion probability as described below.

Based on the appearance frequency of each search keyword, the conversion rule calculation unit 410 calculates, as an occurrence probability value (correspondence probability value) when a specific number of conversion keywords are provided for each search keyword, a probability that the search keywords and the specific number of conversion keywords are associated in predetermined combinations.

Based on the calculated occurrence probability value, the conversion rule calculation unit 410 calculates as an entropy value an entropy of the combinations of the search keywords and the specific number of conversion keywords.

The conversion rule calculation unit 410 calculates an entropy index value by multiplying the calculated entropy value by the occurrence probability.

The conversion rule calculation unit 410 compares the calculated entropy index value with a predetermined entropy threshold value.

If the entropy index value is greater than the entropy threshold value, the conversion rule calculation unit 410 calculates as the conversion keyword number the specific number of conversion keywords.

The conversion rule calculation unit 410 calculates as the conversion probability (conversion keyword selection rate) an inverse number of the conversion keyword number.

Figure 39:
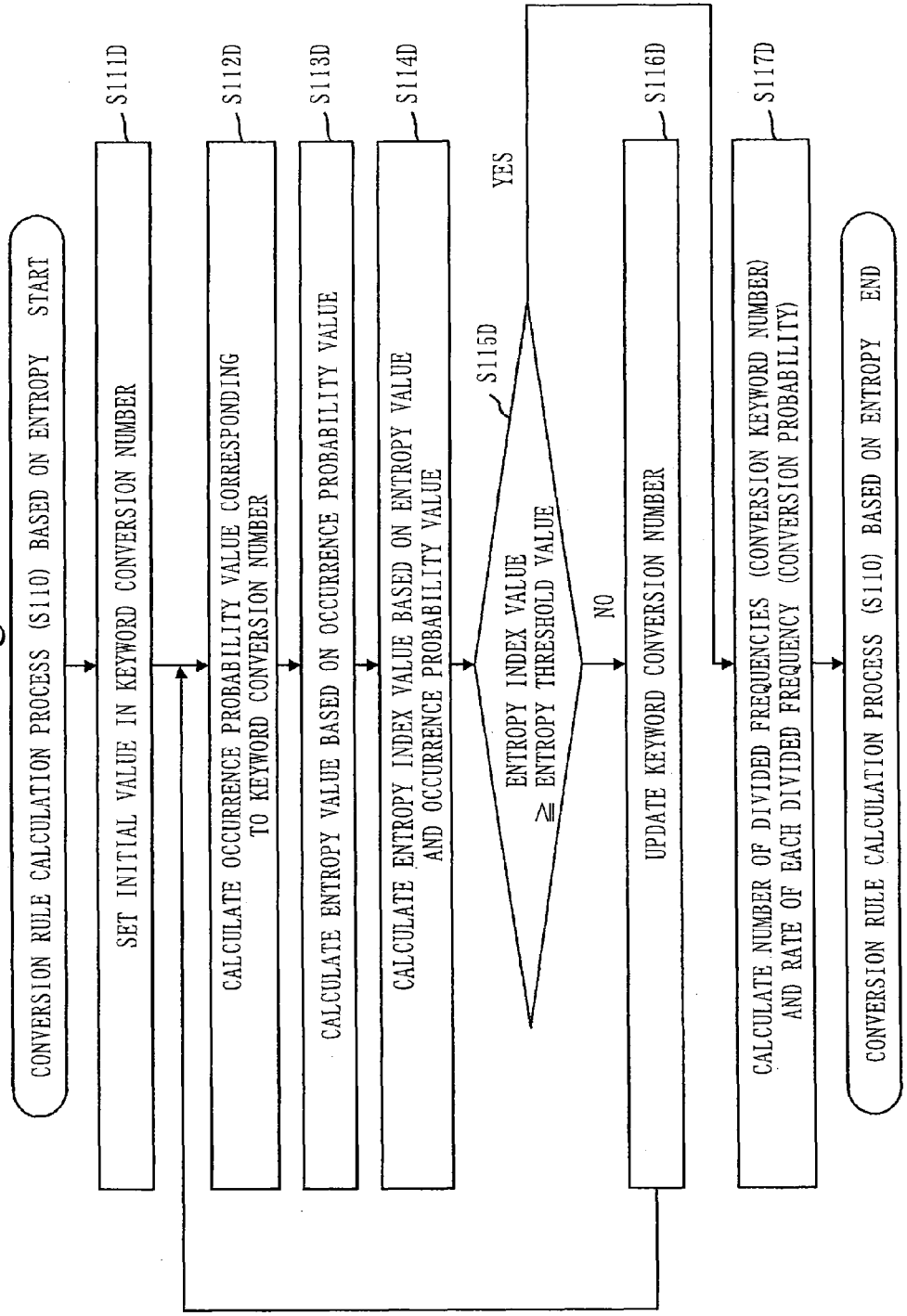
FIG. 39 is a flowchart illustrating a conversion rule calculation process (S110) in a fourth embodiment.

FIG. 39 is a flowchart illustrating a conversion rule calculation process (S110) in a fourth embodiment.

Referring to FIG. 39, the conversion rule calculation process (S110) in the fourth embodiment will be described.

It is assumed hereinafter that a registration data number "N" and an entropy threshold value "H" are given as parameter values representing security.

In S111D, the conversion rule calculation unit 410 sets an initial value "1" in a variable "keyword conversion number w". Note that the initial value may be an integer of 2 or more.

After S111D, processing proceeds to S112D.

In S112D, based on the appearance frequency of each search keyword, the conversion rule calculation unit 410 calculates an occurrence probability value when "w" conversion keywords are provided for each search keyword, "w" being the conversion keyword number. The occurrence probability value is a probability that the search keywords and the "w" conversion keywords are associated in the correct combinations.

FIG. 40 is a diagram illustrating a search keyword table 491 in the fourth embodiment.

FIG. 41 is a diagram showing an example of a conversion rule table 291 in the fourth embodiment.

FIGS. 42 and 43 are diagrams showing examples of combinations of search keywords and conversion keywords in the fourth embodiment.

When one (=w) conversion keyword "married-1" is provided for a search keyword "married" and one conversion keyword "unmarried-1" is provided for a search keyword "unmarried" based on the search keyword table 491 shown in FIG. 40, the conversion rule table 291 (1) shown in FIG. 41 is obtained.

Assuming that the conversion keywords "married-1" and "unmarried-1" are encrypted into encrypted keywords "E (married-1)" and "E (unmarried-1)", there are 2 patterns of combinations of the search keywords and the encrypted keywords as shown in (1) and (2) of FIG. 42. The combinations shown in (1) of FIG. 42 are the correct combinations.

When the keyword conversion number w is "2", the conversion rule table 291 (2) shown in FIG. 41 is obtained based on the search keyword table 491 shown in FIG. 40.

In this case, there are 6 patterns of combinations of the search keywords and the encrypted keywords as shown in (1) to (6) of FIG. 43.

As shown in FIG. 40, the appearance frequency of the search keyword "married" is "75% (=3/4)", and the appearance frequency of the search keyword "unmarried" is "25% (=1/4)".

Accordingly, the registration frequency of the encrypted keyword "E (married-1)" is "75% (=3/4)", and the registration frequency of the encrypted keyword "E (unmarried-1)" is "25% (=1/4)".

When the registration data number "N=10", it is possible that 1 encrypted keyword "E (married-1)" and 9 encrypted keywords "E (unmarried-1)" are registered in the registration data table 391 (see FIG. 11).

It is also possible that 2, 3, . . . , or 10 encrypted keywords "E (married-1)" are registered. Further, it is also possible that the encrypted keyword "E (married-1)" is not registered, that is, there are zero encrypted keywords "E (married-1)".

However, since the conversion keywords are encrypted, it is not possible to identify which encrypted keyword corresponds to which conversion keyword. Thus, the correct combinations of the search keywords and the encrypted keywords cannot be known.

For example, assume that 6 encrypted keywords "E (married-1)" and 4 encrypted keywords "E (unmarried-1)" are registered in the registration data table 391. In this case, when the search keywords and the encrypted keywords are associated in the correct combinations as shown in (1) of FIG. 42, 6 encrypted keywords "E (married-1)" and 4 encrypted keywords "E (unmarried-1)" are registered with a registration probability of $3^6/4^{10}$ $(=(3/4)^6\times(1/4)^4)$. This value is based on the registration data number "10", the registration numbers "6" and "4" of the encrypted keywords, and the registration frequencies "3/4" and "1/4" of the encrypted keywords.

Likewise, when the search keywords and the encrypted keywords are associated in the incorrect combinations as shown in (2) of FIG. 42, the registration probability is $3^4/4^{10}$ $(=(3/4)^4\times(1/4)^6)$.

Thus, 0.9 $(=(3^6/4^{10})$ $(3^6/4^{10}+3^4/4^{10}))$ is a likelihood that the combinations shown in (1) of FIG. 42 are correct. Likewise, 0.1 $(=(3^4/4^{10})/(3^6/4^{10}+3^4/4^{10}))$ is a likelihood that the combinations shown in (1) of FIG. 42 are incorrect. These values are calculated according to Bayes' theorem using the registration probabilities "$3^6/4^{10}$" and "$3^4/4^{10}$". A calculated likelihood will be hereinafter referred to as an "occurrence probability value".

The conversion rule calculation unit 410 calculates the occurrence probability value for each registration number of the encrypted keyword "E (married-1)" as described above. Note that one or more registration data tables having N pieces of registration data may be randomly selected based on the Monte Carlo method, and the occurrence probability value may be calculated for each selected registration data table.

After S112D (FIG. 39), processing proceeds to S113D.

In S113D, based on the occurrence probability value calculated in S112D, the conversion rule calculation unit 410 calculates as an entropy value an entropy of the combinations of the search keywords and the conversion keywords. Note that the conversion rule calculation unit 410 calculates the entropy value for each registration number of the encrypted keyword "E (married-1)". When the occurrence probability value is calculated for each registration data table randomly selected in S112D, the conversion rule calculation unit 410 calculates the entropy value for each registration data table for which the occurrence probability value is calculated.

For example, when the occurrence probability values are "0.9" and "0.1", the entropy value is 0.47 $(\approx-(0.9\log_2 0.9+0.1\log_2 0.1))$.

After S113D, processing proceeds to S114D.

In S114D, for each registration number of the encrypted keyword "E (married-1)", the conversion rule calculation unit 410 multiplies the entropy value A calculated in S113D by a probability B of each registration number of the encrypted keyword "E (married-1)" occurring, thereby calculating a weighted entropy value C $(=A\times B)$.

The weighted entropy value corresponding to a registration number n (n being an integer of 0 to N) of the encrypted keyword "E (married-1)" will be hereinafter denoted as "$C_n$".

The conversion rule calculation unit 410 calculates as an entropy index value "h" a total value of the weighted entropy values $C_n$.

After S114D, processing proceeds to S115D.

In S115D, the conversion rule calculation unit 410 compares the entropy index value "h" calculated in S114D with a predetermined entropy threshold value "H".

If the entropy index value "h" is greater than or equal to the entropy threshold value "H" (YES), processing proceeds to S117D.

If the entropy index value "h" is less than the entropy threshold value "H" (NO), processing proceeds to S116D.

In S116D, the conversion rule calculation unit 410 adds an addition value "1" to the keyword conversion number "w". Note that the addition value may be an integer of 2 or more. The keyword conversion number "w" may be multiplied by an integer.

After S116D, processing returns to S112D.

In S117D, the conversion rule calculation unit 410 outputs the keyword conversion number "w" as the conversion keyword number.

The conversion rule calculation unit 410 also calculates as the conversion probability an inverse number of the conversion keyword number, "1/w".

Other processes (S120-S140) of the conversion rule management method of the conversion rule management device 400 are substantially the same as described in the first embodiment (see FIG. 6).

Note that the conversion probability does not necessarily have to be set for each conversion keyword in the conversion rule table 291. This is because the conversion probability is the same for all the conversion keywords so that it is sufficient to store one conversion probability.

The data registration method of the data registration device 500, the search method of the information processing device 200, and the search method of the server device 300 are substantially the same as described in the first embodiment (see FIGS. 10, 13, and 14).

The fourth embodiment will now be described supplementarily.

A frequency analysis attack is an attack in which the content of an encrypted keyword is guessed by comparing the frequency distribution of search keywords and the frequency distribution of encrypted keywords and funding associations between the search keywords and the encrypted keywords.

If an attacker can obtain a sufficient number of encrypted keywords, it is considered that the frequency distribution of encrypted keywords is sufficiently close to the frequency distribution of search keywords.

Therefore, in each embodiment, a plurality of encrypted keywords having the same frequency are generated to prevent identification of search keywords.

If an attacker can obtain only a small number of encrypted keywords, the frequency distribution of encrypted keywords does not always coincide with the frequency distribution of search keywords.

In this case, it is not possible to identify the contents of encrypted keywords having matching frequencies. In addition, it is difficult to guess the contents of encrypted keywords having similar frequencies.

Thus, in the fourth embodiment, assuming that an attacker obtains a limited amount of encrypted keywords, ambiguity as to associations between encrypted keywords and search keywords (entropy) is represented in a numerical value, and conversion rules are generated using this numerical value as a security index.

In the fourth embodiment, the searchable encryption system 100 such as described below, for example, has been discussed.

In the searchable encryption system 100, the information processing device 200 can perform a search without revealing data and keywords to the server device 300.

By security based on entropy, a certain degree of ambiguity can be secured with respect to guessing of keywords by the server device 300, and furthermore the size of a search request can be reduced compared to the first embodiment.

The conversion probability of each conversion keyword (frequency division number of each search keyword) is uniform, so that the data size of the conversion rule table 291 can be made small. This is because the conversion probability does not have to be set for each conversion keyword.

Note that the conversion probability may be variable for each conversion keyword. For example, search keywords may be divided into groups and a given conversion probability may be used for each group, such as "prefecture names in the Kanto region to be divided into 10" and "prefecture names in the Kinki region to be divided into 9".

In the above description, reduction in search request size and simplification of conversion rules are achieved based on the fixed lower limit of security using entropy. However, security may be enhanced based on the fixed search request size or the fixed complexity of conversion rules.

For example, the average value of search request size (average value of keyword conversion numbers w, conversion keyword numbers) may be limited to 2 or less, and conversion rules that achieve the greatest entropy may be used.

In dividing search keywords into groups, the number of groups may be limited to 3, and conversion rules that achieve the greatest entropy may be used.

REFERENCE SIGNS LIST

100: searchable encryption system, 101: network, 200: information processing device, 210: search keyword input unit, 220: conversion keyword group acquisition unit, 230: encrypted keyword group generation unit, 240: search request unit, 250: search result output unit, 280: processing device communication unit, 290: processing device storage unit, 291: conversion rule table, 292: encryption key data, 293: decryption key data, 300: server device, 310: server device communication unit, 320: data search unit, 330: data registration unit, 390: server device storage unit, 391: registration data table, 400: conversion rule management device, 410: conversion rule calculation unit, 420: conversion keyword group generation unit, 430: conversion rule generation unit, 440: management device communication unit, 490: management device storage unit, 491: search keyword table, 492: divided frequency table, 500: data registration device, 510: registration device input unit, 520: keyword conversion unit, 530: registration data generation unit, 540: registration request unit, 580: registration device communication unit, 590: registration device storage unit, 591: search data table, 901: CPU, 902: bus, 903: ROM, 904: RAM, 905: communication board, 911: display device, 912: keyboard, 913: mouse, 914: drive device, 920: magnetic disk device, 921: OS, 922: programs, 923: files

The invention claimed is:

1. A search system comprising an information processing device, a search device, and a corresponding keyword management device, the information processing device including:

a corresponding keyword storage unit having a processor that stores corresponding keyword data generated by the corresponding keyword management device as data associating a search keyword with a corresponding keyword group including one or more corresponding keywords;

a search keyword input unit having a processor that inputs a search keyword;

a corresponding keyword group acquisition unit having a processor that obtains from the corresponding keyword data stored in the corresponding keyword storage unit a corresponding keyword group associated with the search keyword input by the processor of the search keyword input unit;

an encrypted keyword group generation unit having a processor that encrypts corresponding keywords included in the corresponding keyword group obtained by the processor of the corresponding keyword group acquisition unit, generating an encrypted keyword group;

a search request data transmission unit having a processor that transmits to the search device via a network search request data including the encrypted keyword group generated by the processor of the encrypted keyword group generation unit;

a search response data receiving unit having a processor that receives via the network search response data transmitted from the search device; and a search result output unit having a processor that decrypts encrypted data included in the search response data received by the processor of the search response data receiving unit, and outputs as a search result search data obtained by decryption;

the search device including:

an encrypted data storage unit having a processor that stores encrypted data generated by encrypting each search data and an encrypted keyword generated by encrypting a corresponding keyword, the encrypted data and the encrypted keyword being associated with each other;

a search request data receiving unit having a processor that receives via the network the search request data transmitted by the information processing device;

an encrypted data search unit having a processor that obtains encrypted data associated with a search key from the encrypted data storage unit using as the search key an encrypted keyword included in the encrypted keyword group in the search request data, based on the search request data received by the processor of the search request data receiving unit; and a search response data transmission unit having a processor that transmits via the network the search response data including the encrypted data obtained by the processor of the encrypted data search unit;

the corresponding keyword management device including:

an appearance frequency storage unit having a processor that stores appearance frequency data defining a search keyword and an appearance frequency of the search keyword, the appearance frequency indicating a rate of search data associated with the search keyword;

a corresponding keyword number calculation unit having a processor that calculates as a corresponding keyword number a number of corresponding keywords to be associated with the search keyword, according to the appearance frequency of the search keyword defined in the appearance frequency data stored in the appearance frequency storage unit;

a corresponding keyword group generation unit having a processor that generates as a corresponding keyword group a same number of corresponding keywords as the corresponding keyword number calculated by the processor of the corresponding keyword number calculation unit; and a corresponding keyword data generation unit having a processor that generates the corresponding keyword data by associating the search keyword defined in the appearance frequency data with the corresponding keyword group generated by the processor of the corresponding keyword group generation unit, wherein the processor of the corresponding keyword number calculation unit of the corresponding keyword management device calculates as a corresponding keyword selection rate a rate of selecting each corresponding keyword from the corresponding keyword group of the search keyword, based on the appearance frequency of the search keyword defined in the appearance frequency data, wherein the processor of the corresponding keyword data generation unit of the corresponding keyword management device generates, as corresponding keyword selection rate data, data associating the search keyword with the corresponding keyword group and each corresponding keyword selection rate, the search system further comprising:

an encrypted data generation device including:

a search data storage unit having a processor that stores search data and a search keyword by associating the search data and the search keyword with each other;

a corresponding keyword selection rate storage unit having a processor that stores the corresponding keyword selection rate data generated by the processor of the corresponding keyword management device;

a corresponding keyword selection unit having a processor that obtains from the corresponding keyword selection rate data the corresponding keyword group associated with the search keyword stored in the search data storage unit, and selects at least any one of corresponding keywords included in the corresponding keyword group obtained, according to the corresponding keyword selection rate included in the corresponding keyword selection rate data; and an encrypted data generation unit having a processor that generates encrypted data by encrypting the search data stored in the search data storage unit, and generates an encrypted keyword by encrypting the corresponding keyword selected by the processor of the corresponding keyword selection unit, wherein the encrypted data storage unit of the search device stores the encrypted data and the encrypted keyword generated by the processor of the encrypted data generation device by associating the encrypted data and the encrypted keyword with each other.

2. The search system according to claim 1, wherein the processor of the corresponding keyword number calculation unit of the corresponding keyword management device calculates the corresponding keyword number of each search keyword such that an appearance frequency of the each search keyword after being divided by the corresponding keyword number of the each search keyword is uniform, and wherein the processor of the corresponding keyword number calculation unit calculates as the corresponding keyword selection rate an inverse number of the corresponding keyword number for each search keyword.

3. The search system according to claim 2, wherein the processor of the corresponding keyword number calculation unit calculates a greatest common divisor of appearance frequencies of search keywords, and calculates as the corresponding keyword number of each search keyword a value obtained by dividing the appearance frequency of the each search keyword by the greatest common divisor.

4. The search system according to claim 1, wherein the processor of the corresponding keyword number calculation unit of the corresponding keyword management device calculates as the corresponding keyword number of each search keyword a division number for dividing the appearance frequency of the each search keyword such that at least a predetermined anonymity number of search keywords have a same appearance frequency, and calculates as the corresponding keyword selection rate of the each search keyword a division rate for dividing the appearance frequency of the each search keyword.

5. The search system according to claim 1,
wherein the processor of the corresponding keyword number calculation unit selects as a computing frequency a "k"th greatest appearance frequency from appearance frequencies of search keywords, "k" being a predetermined anonymity number, subtracts the computing frequency one or more times from an appearance frequency greater than or equal to the computing frequency, selects as a new computing frequency a "k"th greatest appearance frequency from the appearance frequencies of the search keywords after subtraction, subtracts the new computing frequency one or more times from an appearance frequency greater than or equal to the new computing frequency, calculates as the corresponding keyword number of each search keyword a number of times each of the computing frequencies is subtracted from the appearance frequency of the each search keyword, and calculates as the corresponding keyword selection rate a rate of each of the computing frequencies with respect to the appearance frequency before subtraction.

6. The search system according to claim 1,
wherein the processor of the corresponding keyword number calculation unit divides the appearance frequency of each search keyword into a plurality of appearance frequencies using an exponential value of a predetermined base, calculates as the corresponding keyword number of the each search keyword a division number of the appearance frequency of the each search keyword, and calculates as the corresponding keyword selection rate a rate of a divided appearance frequency with respect to the appearance frequency before being divided.

7. The search system according to claim 6,
wherein the processor of the corresponding keyword number calculation unit, using the exponential value of the base, divides an appearance frequency that is common to less than a predetermined anonymity number of search keywords among the appearance frequencies of the search keywords after being divided.

8. The search system according to claim 1,
wherein the processor of the corresponding keyword number calculation unit calculates a corresponding probability value based on the appearance frequency of each search keyword, the corresponding probability value indicating a probability that the each search keyword and each of a specific number of corresponding keywords are associated in a predetermined combination, calculates as an entropy value an entropy of the predetermined combination based on the calculated corresponding probability value, calculates an entropy index value by multiplying the calculated entropy value by the corresponding probability value, compares the calculated entropy index value with a predetermined entropy threshold value, and calculates the specific number as the corresponding keyword number when the entropy index value is greater than the entropy threshold value, and
wherein the processor of the corresponding keyword number calculation unit calculates as the corresponding keyword selection rate an inverse number of the corresponding keyword number.

9. A search method of a search system comprising an information processing device, a search device, and a corresponding keyword management device, the information processing device including circuitry that stores corresponding keyword data generated by the corresponding keyword management device as data associating a search keyword with a corresponding keyword group including one or more corresponding keywords, the method comprising:

inputting at the information processing device, a search keyword;

obtaining, by the information processing device and from the corresponding keyword data stored in the circuitry of the information processing device, a corresponding keyword group associated with the search keyword input;

encrypting, at the information processing device, corresponding keywords included in the corresponding keyword group obtained and generating an encrypted keyword group; and transmitting, from the information processing device via a network to the search device, search request data including the encrypted keyword group generated, wherein the search device includes circuitry that stores encrypted data generated by encrypting each search data and an encrypted keyword generated by encrypting a corresponding keyword, the encrypted data and the encrypted keyword being associated with each other;

receiving, at the search device and via the network, the search request data transmitted from the information processing device;

obtaining, at the search device from the circuitry thereof, encrypted data associated with a search key using as the search key an encrypted keyword included in the encrypted keyword group in the search request data, based on the search request data received;

transmitting, from the search device via the network, search response data including the encrypted data obtained;

receiving, at the information processing device and via the network, the search response data transmitted by the search device; and decrypting, at the information processing device, the encrypted data included in the search response data received and outputting as a search result search data obtained by decryption, wherein the corresponding keyword management device includes circuitry that stores appearance frequency data defining a search keyword and an appearance frequency of the search keyword, the appearance frequency indicating a rate of search data associated with the search keyword, and the method further comprises:

calculating, at the corresponding keyword management device, as a corresponding keyword number a number of corresponding keywords to be associated with the search keyword, according to the appearance frequency of the search keyword defined in the appearance frequency data stored in the circuitry of the corresponding keyword management device;

generating, at the corresponding keyword management device, as a corresponding keyword group a same number of corresponding keywords as the corresponding keyword number calculated, each of the keywords in the corresponding keyword group having a sequential number appended thereto, the sequential number being less than or equal to the corresponding keyword number; and generating, by the corresponding keyword management device, the corresponding keyword data by associating the search keyword defined in the appearance frequency data with the corresponding keyword group generated, wherein a corresponding keyword selection rate is calculated by the circuitry of the corresponding keyword management device as a rate of selecting each corresponding keyword from the corresponding keyword group of the search keyword, based on the appearance frequency of the search keyword defined in the appearance frequency data, wherein data associating the search keyword with the corresponding keyword group and each corresponding keyword selection rate is generated by the circuitry of the corresponding keyword management device as corresponding keyword selection rate data, and the search method further comprises:

storing, with circuitry of an encrypted data generation device, search data and a search keyword by associating the search data and the search keyword with each other;

storing, with the circuitry of the encrypted data generation device, the corresponding keyword selection rate data generated by the corresponding keyword management device;

obtaining, with the circuitry of the encrypted data generation device, from the corresponding keyword selection rate data the corresponding keyword group associated with the search keyword, and selects at least any one of corresponding keywords included in the corresponding keyword group obtained, according to the corresponding keyword selection rate included in the corresponding keyword selection rate data; and generating, with the circuitry of the encrypted data generation device, encrypted data by encrypting the search data, and generates an encrypted keyword by encrypting the corresponding keyword selected, wherein the encrypted data and the encrypted keyword generated by the encrypted data generation device are stored by the circuitry of the search device, and the encrypted data and the encrypted keyword are associated with each other.

10. An information processing device comprising:

a corresponding keyword storage unit having a processor that stores corresponding keyword data generated by a corresponding keyword management device by associating a search keyword with a corresponding keyword group including one or more corresponding keywords, wherein the corresponding keyword management device includes:

an appearance frequency storage unit having a processor that stores appearance frequency data defining a search keyword and an appearance frequency of the search keyword, the appearance frequency indicating a rate of search data associated with the search keyword, a corresponding keyword number calculation unit having a processor that calculates as a corresponding keyword number a number of corresponding keywords to be associated with the search keyword, according to the appearance frequency of the search keyword defined in the appearance frequency data stored in the appearance frequency storage unit, a corresponding keyword group generation unit having a processor that generates as a corresponding keyword group a same number of corresponding keywords as the corresponding keyword number calculated by the processor of the corresponding keyword number calculation unit, and a corresponding keyword data generation unit having a processor that generates, as corresponding keyword data, data associating the search keyword defined in the appearance frequency data with the corresponding keyword group generated by the processor of the corresponding keyword group generation unit, the information processing device further comprising:

a search keyword input unit having a processor that inputs a search keyword;

a corresponding keyword group acquisition unit having a processor that obtains from the corresponding keyword data stored in the corresponding keyword storage unit a corresponding keyword group associated with the search keyword input by the processor of search keyword input unit;

an encrypted keyword group generation unit having a processor that encrypts corresponding keywords included in the corresponding keyword group, generating an encrypted keyword group, based on the corresponding keyword group obtained by the processor of the corresponding keyword group acquisition unit;

a search request data transmission unit having a processor that transmits via a network to a predetermined search device search request data including the encrypted keyword group generated by the processor of the encrypted keyword group generation unit;

a search response data receiving unit having a processor that receives via the network search response data transmitted by the search device; and a search result output unit having a processor that decrypts the encrypted data included in the search response data received by the processor of the search response data receiving unit, and outputs as a search result search data obtained by decryption, wherein the processor of the corresponding keyword number calculation unit calculates as a corresponding keyword selection rate a rate of selecting each corresponding keyword from the corresponding keyword group of the search keyword, according to the appearance frequency of the search keyword defined in the appearance frequency data, and wherein the processor of the corresponding keyword generation unit generates, as corresponding keyword selection rate data, data associating the search keyword with the corresponding keyword group and each corresponding keyword selection rate, and wherein the processor of the corresponding keyword number calculation unit calculates as the corresponding keyword number of each search keyword a division number for dividing the appearance frequency of the each search keyword such that at least a predetermined anonymity number of search keywords have a same appearance frequency, calculates as the corresponding keyword selection rate of the each search keyword a division rate for dividing the appearance frequency of the each search keyword, and outputs information corresponding to the corresponding keyword selection rate via a network.

11. The information processing device according to claim 10, wherein the processor of the corresponding keyword number calculation unit selects as a computing frequency a "k"th greatest appearance frequency from appearance frequencies of search keywords, "k" being a predetermined anonymity number, subtracts the computing frequency one or more times from an appearance frequency greater than or equal to the computing frequency, selects as a new computing frequency a "k"th greatest appearance frequency from the appearance frequencies of the search keywords after subtraction, subtracts the new computing frequency one or more times from an appearance frequency greater than or equal to the new computing frequency, calculates as the corresponding keyword number a number of times each of the computing frequencies is subtracted from the appearance frequency of the each of the search keywords, and calculates as the corresponding keyword selection rate a rate of each of the computing frequencies with respect to the appearance frequency before subtraction.

12. The information processing device according to claim 10, wherein the processor of the corresponding keyword number calculation unit divides the appearance frequency of each search keyword into a plurality of appearance frequencies using an exponential value of a predetermined base, calculates as the corresponding keyword number of the each search keyword a division number of the appearance frequency of the each search keyword, and calculates as the corresponding keyword selection rate a rate of a divided appearance frequency with respect to the appearance frequency before division.

13. The information processing device according to claim 12, wherein the processor of the corresponding keyword number calculation unit, using the exponential value of the base, divides an appearance frequency that is common to less than a predetermined anonymity number of search keywords among the appearance frequencies of the search keywords after being divided.

14. The information processing device according to claim 10, wherein the processor of the corresponding keyword number calculation unit calculates a corresponding probability value based on the appearance frequency of each search keyword, the corresponding probability value indicating a probability that the each search keyword and each of a specific number of corresponding keywords are associated in a predetermined combination, calculates as an entropy value an entropy of the predetermined combination based on the calculated corresponding probability value, calculates an entropy index value by multiplying the calculated entropy value by the corresponding probability value, compares the calculated entropy index value with a predetermined entropy threshold value, and calculates the specific number as the corresponding keyword number when the entropy index value is greater than the entropy threshold value, and wherein the processor of the corresponding keyword number calculation unit calculates as the corresponding keyword selection rate an inverse number of the corresponding keyword number.

\* \* \* \* \*